US006639610B1

(12) United States Patent
Sponheim et al.

(10) Patent No.: US 6,639,610 B1
(45) Date of Patent: Oct. 28, 2003

(54) METHOD AND APPARATUS FOR ASSIGNING URLS TO GRAPHICAL OBJECTS IN A WEB PAGE

(75) Inventors: Tom A. Sponheim, Seattle, WA (US); Bella Acharya, Kirkland, WA (US); Jack Litewka, Seattle, WA (US); Jamie A. Spooner, Redmond, WA (US); William A. Spencer, Redmond, WA (US); Stephen H. Buroker, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/481,843

(22) Filed: Jan. 14, 2000

(51) Int. Cl.[7] .................................................. G09G 5/00
(52) U.S. Cl. ....................... 345/760; 345/780; 345/745; 345/840
(58) Field of Search ................................. 345/760, 780, 345/835, 810, 811, 745, 840

(56) References Cited

U.S. PATENT DOCUMENTS

| 5,774,670 | A | * | 6/1998 | Montulli | ..................... | 709/227 |
| 6,167,383 | A | * | 12/2000 | Henson | ........................ | 705/26 |
| 6,243,700 | B1 | * | 6/2001 | Zellweger | ...................... | 707/3 |
| 2001/0043235 | A1 | * | 11/2001 | Best et al. | .................. | 345/781 |

OTHER PUBLICATIONS

Simon St. Laurent, "Cookies": 1998. The McGraw–Hill Companies, pp.: 116–123.*
www.wunderground.com, captured Nov. 15, 1999. The Weather Underground, Inc.*
www.webradio.com, captured Nov. 28, 1999. BRS Media.*
www.framesearch.net, captured Nov. 4, 1999, W3COM.*
www.weather.com, captured Oct. 13, 1999. The Weather Channel Enterprises, Inc.*
my.netscape.com, captured Feb. 18, 1999. Netscape.*
www.broadcast.com/radio/, captured Oct. 4, 1999. Yahoo? Inc.*
Dynamic Duo Cross–Browser Dynamic HTML Tutorial. Dan Steinman. 1998. http://www.dansteinman.com/dynduo/.*
Website titled "RealNetworks" at wysiwyg://4http://www-.real.com/.
Website titled "OnNow Live Online Events" at http://onnow.com/.
Website titled "DIRECTTV" at http://www.directTV.com/.
Website titled "Yahoo! Net Events" at http://events.yahoo-.com/.

(List continued on next page.)

Primary Examiner—John Cabeca
Assistant Examiner—Brian Detwiler
(74) Attorney, Agent, or Firm—Banner & Witcoff, Ltd.

(57) ABSTRACT

Methods and a data structure for assigning URLs (e.g., to radio-station-streaming-media-content sources) to graphical objects (such as buttons) are disclosed. In one aspect of the present invention, zip codes are used to identify and assign geographically relevant URLs to buttons. In a second aspect of the invention, a graphical user interface enables a user to select from a plurality of radio buttons and menu entries in order to identify search results satisfying the user's selection, criteria. In a third aspect of this invention, search results are displayed in an IFRAME so that the Web page need not be replotted each time the server identifies URLs satisfying the user selection criteria. In a fourth aspect of this invention, information identifying a user's button assignments or preferences (such as the user's zip code) is store in various data fields in a cookie data structure. The computer-executable instructions use the information contained in the cookie data structure in order to assign the URL to the button each time the Web page is displayed.

3 Claims, 11 Drawing Sheets

OTHER PUBLICATIONS

Website titled "broadcast.com Home" at wysiwyg://11/ http://broadcast.com/.

Website titled "Web–Radio" at http://www.web–radio.com/index2.html.

Website titled "Imagine Radio" at http://www.imagineradio.com/.

Website titled "VideoSeeker" at wysiwyg://22/http://www.videoseeker.com/.

Website titled "When.com" at http://www.when.com/cgi-–bin/gx.cgi/AppLogic+Login.

Website titled "ChannelSEEK" at http://channelseek.com.

Website titled "Jump!" at http://www.jump.com/.

Website titled "UBL.COM—Music's Homepage" at wysiwyg://41/http://www.ubl.com/fp.asp?layout=main_front_page.

* cited by examiner

METHOD AND APPARATUS FOR ASSIGNING URLS TO GRAPHICAL OBJECTS IN A WEB PAGE

FIELD OF THE INVENTION

The present invention relates to the field of Web pages containing URLs that identify streaming-media-content sources and, in particular, to methods and data structures for assigning URLs on the Internet to graphical objects (such as buttons) displayed on Web pages.

BACKGROUND OF THE INVENTION

In recent years, there has been a tremendous proliferation of computers connected to a global network known as the Internet. A "client" computer connected to the Internet can download digital information from "server" computers connected to the Internet. Client application and operating system software executing on client computers typically accepts commands from a user and obtains data and services by sending requests to server applications running on server computers connected to the Internet. A number of protocols are used to exchange commands and data between computers connected to the Internet. The protocols include the Hyper Text Transfer Protocol (HTTP), the File Transfer Protocol (FTP), the Simple Mail Transfer Protocol (SMTP), Gopher and other protocols.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents (a/k/a Web pages). A Web site may use one or more Web server computers that are able to store and distribute documents in one of a number of formats including the Hyper Text Markup Language (HTML). An HTML document can contain text, graphics, audio clips and video clips, as well as metadata or commands providing formatting information. HTML documents also include embedded links, such as URLs, that reference other data or Web pages located on the local computer or network server computers. "URL" is an abbreviation for "uniform resource locator," the global address of documents and other resources on the World Wide Web.

FTP is the protocol used on the Internet for sending files. Further, SMTP is a protocol for sending e-mail messages between servers. Most e-mail systems that send mail over the Internet use SMTP to send messages from one server to another; the messages can then be retrieved with an e-mail client. In addition, SMTP is generally used to send messages from a mail client to a mail server.

Gopher is a system that pre-dates the World Wide Web for organizing and displaying files on Internet servers. A Gopher server presents its contents as a hierarchically structured list of files. With the ascendance of the Web, most Gopher databases are being converted to Web sites which can be more easily accessed via Web search engines.

A Web browser is a client application, software component, or operating system utility that communicates with server computers via FTP, HTTP and Gopher protocols. Web browsers receive Web documents (i.e., Web pages) from the network and present them to a user. Internet Explorer, available from Microsoft Corporation, of Redmond, Wash., is an example of a popular Web browser.

Recently, many users have started utilizing their Web browsers to locate streaming-media sources. After a streaming-media source is located, the Web browser works in conjunction with a media player in order to play the media on the client computer's monitor and/or speakers. An example of a popular media player is Windows Media Player, also available from Microsoft Corporation. A streaming-media source is a source (e.g., a URL) that "streams" media/data to a client computer. Streaming is a technique for transferring data such that it can be processed as a steady and continuous stream. Streaming technologies are becoming increasingly important with the growth of the Internet because most users do not have fast enough access to download large multimedia files quickly. With streaming, the Web browser or media player can start displaying the data before the entire file has been transmitted. An example of a streaming-media source is a radio station that "streams" its broadcast to users on the Internet. In this example, the streaming-media source (i.e., radio station) is loaded from the Internet and played on a client computer using the Windows Media Player.

Unfortunately, there are a number of problems with currently available Web pages that attempt to identify available streaming-media sources, such as radio stations. For example, the prior art usually provides one or more Web pages that contain myriad hyperlinks to various streaming-media sources. These Web pages are slow and are difficult to navigate. Some Web pages are hierarchical in that selection of one hyperlink leads a user to another Web page that contains even more choices. However, each time a selection is made, the entire Web page needs to be replotted (i.e., regenerated and redisplayed). Again, this method is inefficient as well as confusing to the user. Another problem is that users are unable to customize streaming-media content on Web pages. For example, prior-art Web pages do not allow users to identify their preferred streaming-media sources and do not provide users with preset buttons for quick navigation. Lastly, the prior art does not allow users to assign their preferred streaming-media sources to graphical objects depicted on the Web page. Similarly, the prior art is unable to remember a user's preferred streaming-media sources.

Accordingly, it is an object of the present invention to provide improved methods and data structures for assigning URLs on the Internet to graphical objects (such as buttons) displayed on Web pages. In short, this will help users to locate, place and use streaming-media sources.

SUMMARY OF THE INVENTION

The present invention is stored as computer-executable instructions on a computer-readable medium. One aspect of the present invention is a text box and at least one button displayed on a Web page. Using a Web browser, a user is allowed to manually enter a zip code into the text box. After manual entry of the zip code, at least one URL geographically relevant to the zip code is assigned to at least one graphical object, such as a button. The URL identifies a source of streaming-media content such as a radio station. Thus, for example, input of a zip code can cause the present invention to assign the URLs for radio stations within or in close proximity to the zip code to buttons displayed on the Web page.

This zip code can be stored in a data field in a cookie data structure. The present invention uses the zip code contained in the cookie data structure in order to assign URLs to buttons each time the Web page is displayed. After entry of a zip code, the zip-code text box can be replaced with a hyperlink that identifies the current zip-code selection and allows the user to modify the chosen zip code.

Another aspect of this invention is a method of providing and selecting from a menu on a display, wherein the invention includes a computer system with a graphical user interface having the display and a user interface selection device. A plurality of radio buttons is displayed on a Web page and each of the radio buttons is associated with a set of menu entries. A user is allowed to select one of the radio buttons and the set of menu entries associated with the selected radio button are then retrieved and displayed. A user is next allowed to select one entry out of the set of menu entries. The results corresponding to the user selected one entry are displayed on the Web page.

Preferably, the plurality of radio buttons is selected from a group consisting of: U.S. State, International and Format. The menu items corresponding to the "U.S. State" radio button can include: Arizona, California, Colorado, Connecticut, District of Columbia, Delaware, Florida, Georgia, Illinois, Indiana, Kansas, Kentucky, Louisiana, Massachusetts, Maryland, Michigan, Missouri, North Carolina, Nebraska, New York, Ohio, Oklahoma, Oregon, Pennsylvania, Rhode Island, South Carolina, Tennessee, Texas, Utah, Washington, Wisconsin and/or West Virginia, as well as any other state in the United States. Similarly, the menu items corresponding to the "International radio button can include: Argentina, Australia, Belgium, Brazil, Canada, Czech Republic, Germany, Greece, Hong Kong, Italy, Japan, Korea, Latvia, Mexico, Portugal, Senegal, South Africa, Spain, Switzerland, Taiwan, Turkey, United Kingdom and/or United States, as well as any other country in the world. Further, the set of menu items corresponding to the "Format" radio button can include: Adult Contemporary, Alternative Rock, Christian Contemporary, Classic Rock, Classical, Country, International, Jazz, Miscellaneous, Modern Rock, News Radio, Oldies, Sports Radio, Talk Radio, Top 40 and/or Urban, as well as any other music format.

In another aspect of the present invention, computer-executable instructions display a Web page to a user on a client computer. After the user makes at least one selection on the Web page, search criteria are identified based on the selection made by the user. The client computer transmits the search criteria to a server. The server identifies at least one URL satisfying the user search criteria. Preferably, the URL identifies a radio-station source of streaming-media content. The server returns the URL to the client computer where the URL is displayed in an IFRAME on the Web page. By displaying the URL in an IFRAME, the Web page need not be replotted each time the server identifies URLs satisfying the user selection criteria.

In still another aspect of the present invention, computer-executable instructions allow a user to assign at least one URL to at least one graphical object, such as a button, displayed on a Web page. Information identifying the user's assignment is stored in a data field of a cookie data structure. The computer-executable instructions use the information contained in the cookie data structure in order to assign the URL to the graphical object each time the Web page is displayed. Preferably, the URL identifies a radio-station source of streaming-media content.

BRIEF DESCRIPTION OF THE DRAWINGS

The present invention may take physical form in certain parts and steps, preferred embodiments of which will be described in detail in this specification and illustrated in the accompanying drawings which form a part hereof, wherein.

DETAILED DESCRIPTION OF THE INVENTION

The present invention provides methods and a data structure for assigning URLs (e.g., to radio-station-streaming-media-content sources) to graphical objects. For example, the present invention can use zip codes to identify and assign geographically relevant URLs to buttons. In addition, the graphical user interface of this invention allows users to select from a plurality of radio buttons and menu entries in order to identify search results satisfying the user's selection criteria. Further, an IFRAME is used to display search results so that Web pages need not be replotted each time a server identifies URLs satisfying the user selection criteria. Furthermore, this invention stores information identifying a user's button assignments or preferences (such as the user's zip code) in various data fields in a cookie data structure. The computer-executable instructions use the information contained in the cookie data structure in order to assign URLs to buttons each time the Web page is displayed. These and other aspects of the present invention are described in detail below.

Figure 1:
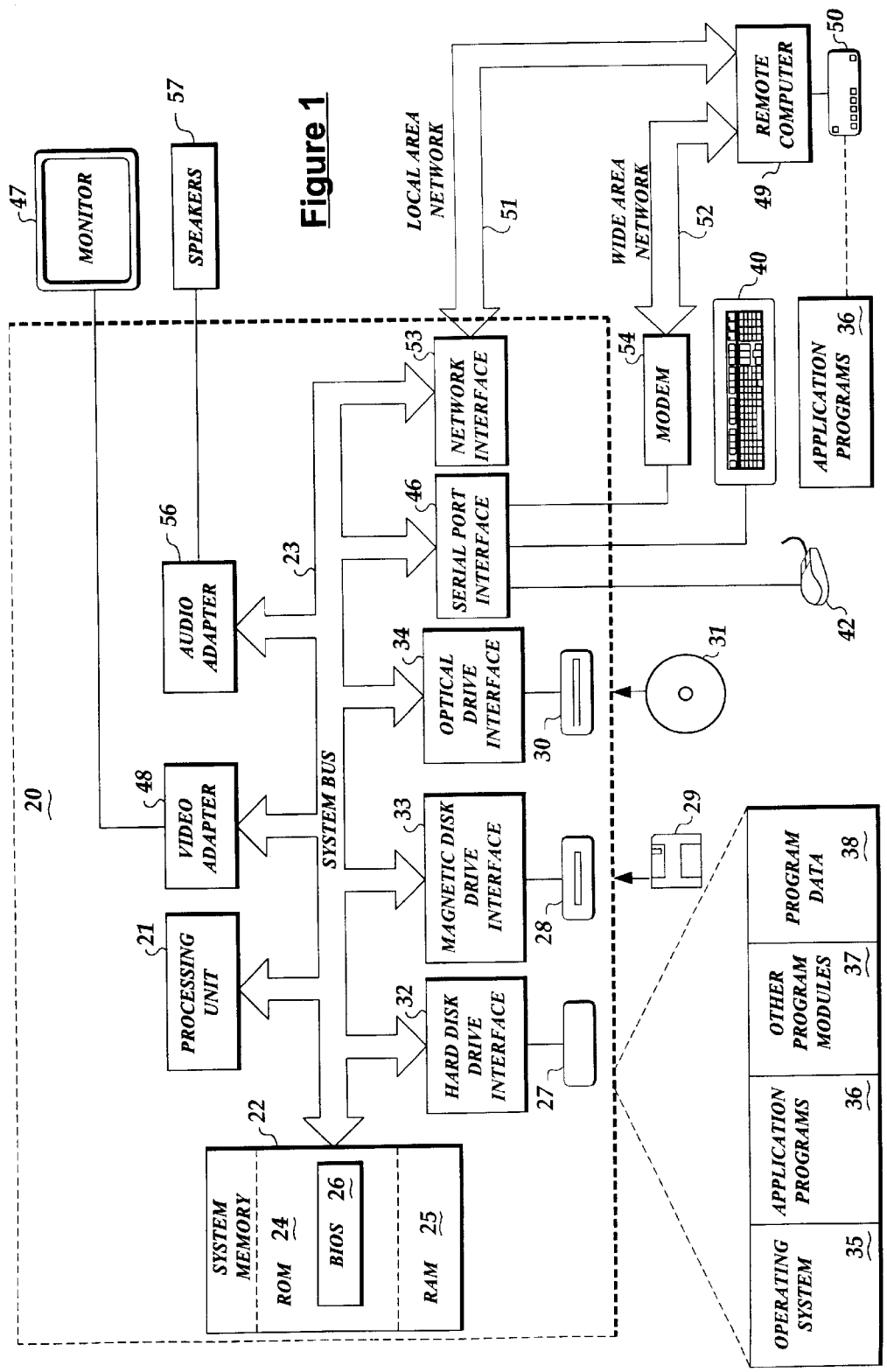
FIG. 1 is a block diagram of a general-purpose computer system for implementing the present invention.

In accordance with the present invention, a Web browser executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22 and a system bus 23 that couples various system components including the system memory to the processing unit 21. The system bus 23 may be any of several types of bus structures including a memory bus or memory controller, a peripheral bus and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29 and an optical disk drive 30 for reading from or writing to a removable optical disk 31 such as a CD ROM or other optical media. The hard disk drive 27, magnetic disk drive 28 and optical disk drive 30 are connected to the system bus 23 by a hard disk drive interface 32, a magnetic disk drive interface 33 and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM) and the like, may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60. Each remote computer 49 or 60 may be another personal computer, a server, a router, a network PC, a peer device or other common network node and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
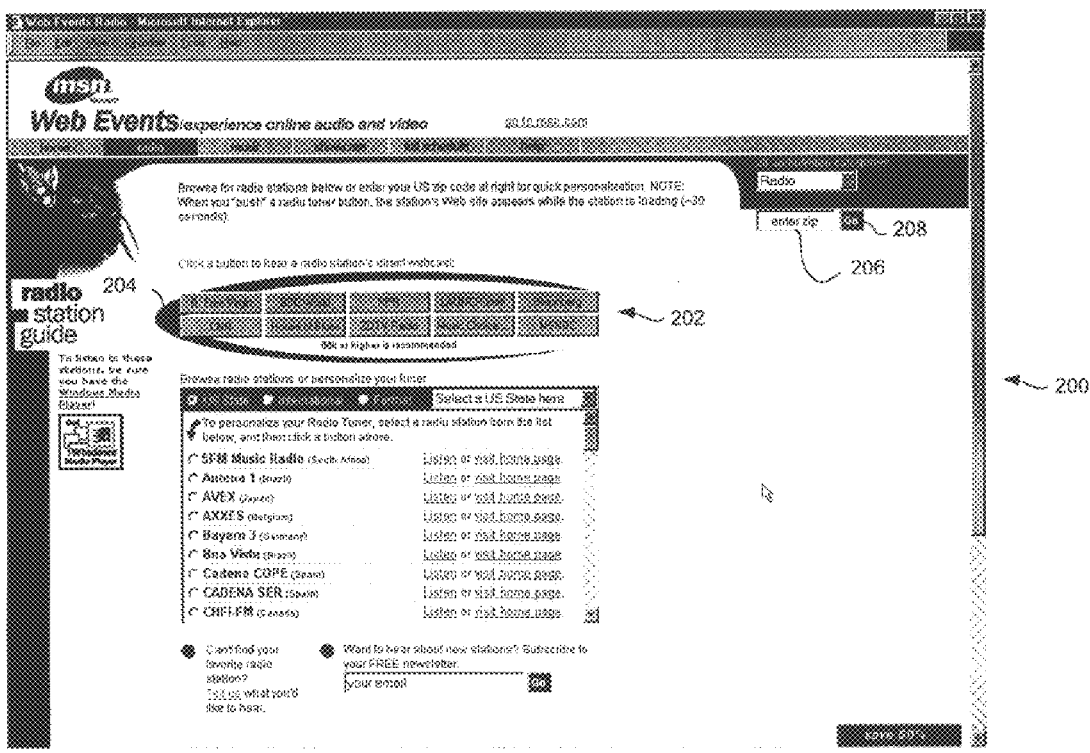
FIGS. 2 and 3 illustrate a Web browser displaying a Web page in accordance with the present invention wherein a text box is provided for manual input of a user's zip code and wherein buttons are provided for radio station selection.
Figure 3:
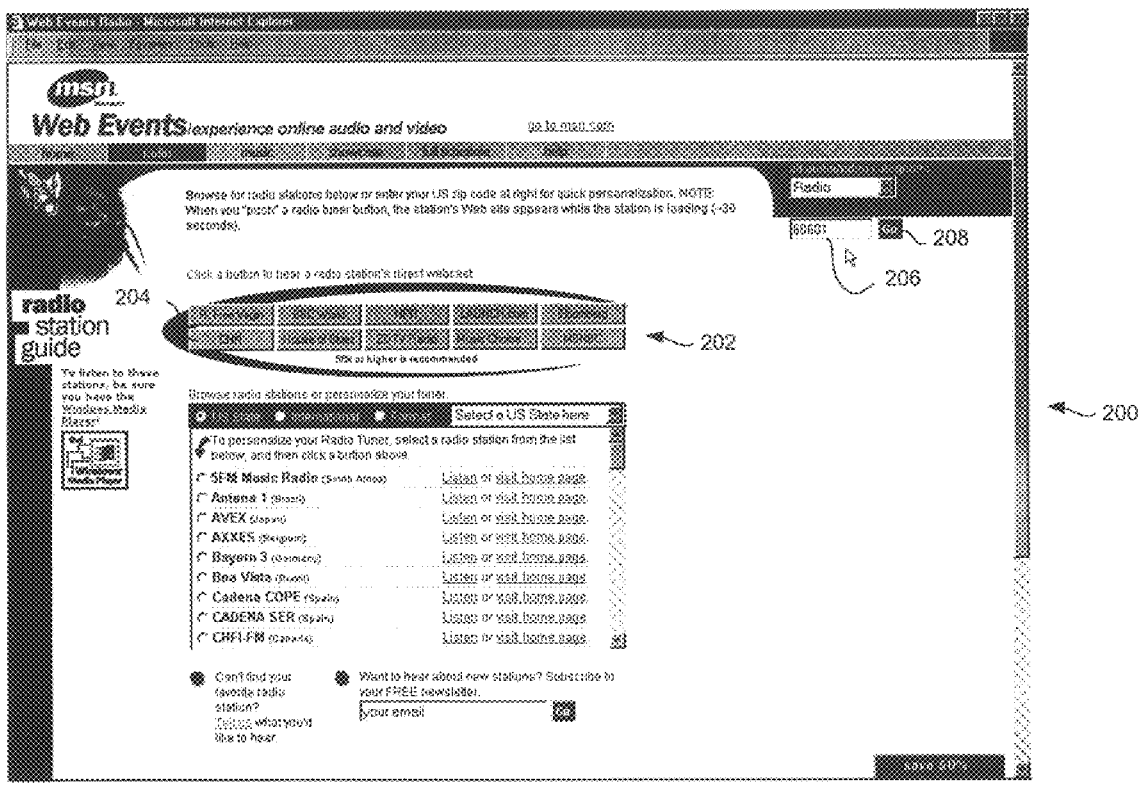

FIGS. 2 and 3 illustrate a Web browser displaying an exemplary Web page 200 in accordance with the present invention. As shown in the figures, a plurality of "radio buttons" is provided on the Web page. As used herein, "radio buttons" are defined as buttons that allow users to choose one—and only one—item from a group. For example, a typical use of a group of radio buttons is to ask for an exclusive response, such as the means of payment for an order (credit card, check and so forth). Because there can only be one payment type specified the radio buttons ensure that only the selected payment type is shown as selected.

One group of buttons on the Web page 200 is the preset-tuner buttons 202. Of course, persons of skill in the art will readily appreciate that only the circular objects adjacent the text "US State," "International" and "Format" are "radio buttons." The text "US State," "International" and "Format" is merely text. The rectangular objects are "buttons" but are not "radio-buttons". These buttons 202 are assigned to URLs identifying various streaming-media-content sources. In this example, the buttons 202 are assigned to radio stations; however, any streaming-media-content source or other content source could be used. Each button is labeled with sufficient text to identify the URL currently assigned to the button. For example, button 204 is assigned to CNN. If a user clicks on button 204, the Windows Media Player will contact the URL assigned to the button (i.e., CNN) and start playing the CNN broadcast on the local computer's speaker(s) 57.

A text box 206 is also provided on the Web page 200. The text box 206 allows a user to manually input his or her zip code. After a user enters a zip code, the user clicks on the "go" button 208. As shown in FIG. 3, a user could enter the zip code "60601" in text box 206 and then click on the "go"

button 208. The Web browser sends this zip-code information to the server computer hosting the Web page 200. The server would then search its memory or search a database in order to identify at least one radio station (or other streaming-media-content sources) that is geographically relevant to the zip code. As used herein, the term "geographically relevant" means that it is possible for a user, who is located in a zip code, to use a standard radio antenna and receiver to listen to the radio station's broadcast. Of course, the "broadcast" is the radio station's wireless transmission through space of electromagnetic waves in the approximate frequency range from 10 kilohertz to 300,000 megahertz. Preferably, the server would search its memory or search its database in order to identify radio stations with broadcast towers that are geographically close the zip code. As used herein, the term "geographically close" means that the broadcast tower is in close proximity to the zip code and, more particularly, located within 10, 20, 30, 40, 50, 60, 70, 80, 90 or 100 miles of any portion of the zip code. After this search is completed, the server returns the results of the search to the Web browser.

Figure 4:
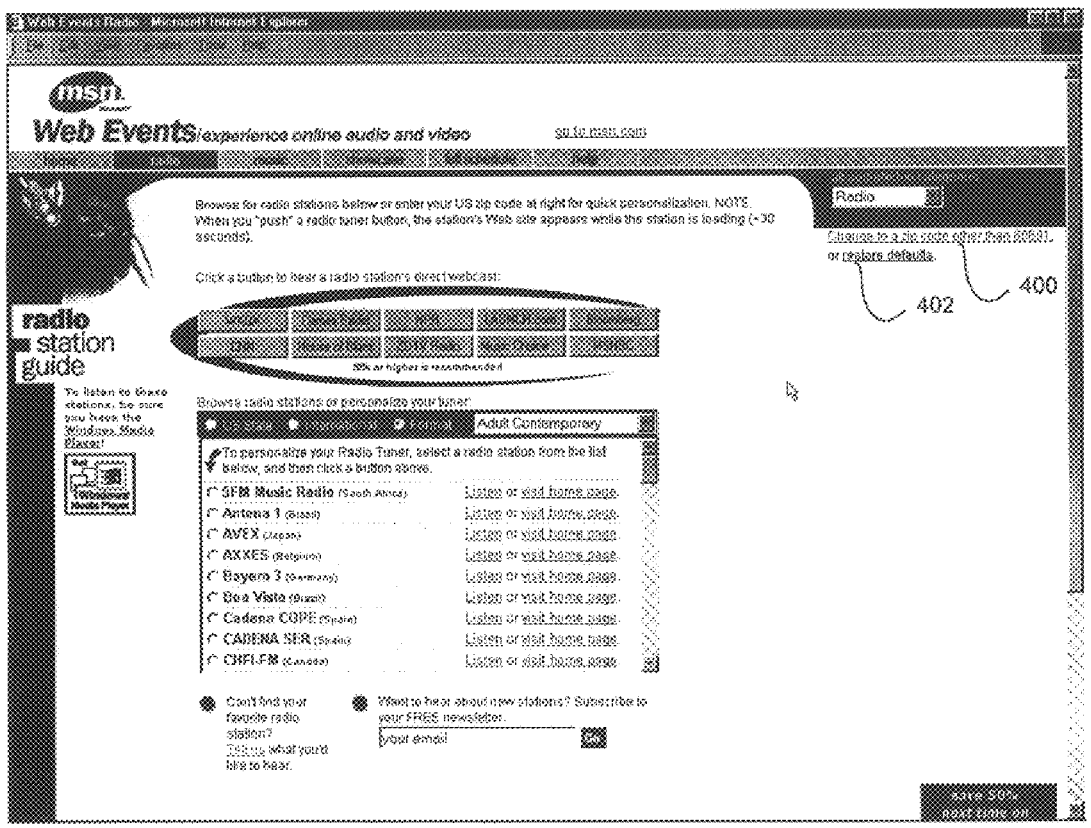
FIG. 4 shows a Web browser displaying, after a user has manually entered a zip code, hyperlinks identifying the current zip-code selection and enabling user modification of the zip-code selection, and buttons assigned radio-station URLs geographically relevant to the zip code.

FIG. 4 shows the resulting Web page 200 displayed by the Web browser after the server has returned the search results. Notably, the default values for the preset-radio-tuner buttons 202 have been changed. Previously, the default radio stations for the preset-tuner buttons were—as shown in FIG. 3: R. Free Virgin, BBC World, NPR, LAUNCH.com, Bloomberg, CNN, House of Blues, ZD TV Radio, Music Choice and MSNBC. After returning the search results for zip code "60601," the preset-tuner buttons 202 were assigned to URLs for radio stations geographically relevant to the zip code. In this example, the preset-tuner buttons were assigned to the following radio stations: WKQX, Flames Radio, NPR, LAUNCH.com, Bloomberg, CNN, House of Blues, ZD TV Radio, Music Choice and MSNBC. Thus, "R. Free Virgin" was changed to "WKQX" and "BBC World" was changed to "Flames Radio."

In addition to assigning at least one geographically relevant radio station to one of the preset-radio-tuner buttons 202, the Web page 200 also removed the text box 206 and "go" button 208. The text box 206 and button 208 were replaced with hyperlinks 400 and 402. A "hyperlink" is an element in an electronic document that links to another place in the same document or to an entirely different document. In this case, the hyperlink 400 identifies the user's current zip-code selection and enables the user to change the zip-code selection. Clicking on this hyperlink 400 redisplays text box 206 and "go" button 208 and allows the user to change the zip code. Similarly, hyperlink 402 allows the user to restore the default stations for the preset-tuner buttons 202.

Figure 5:
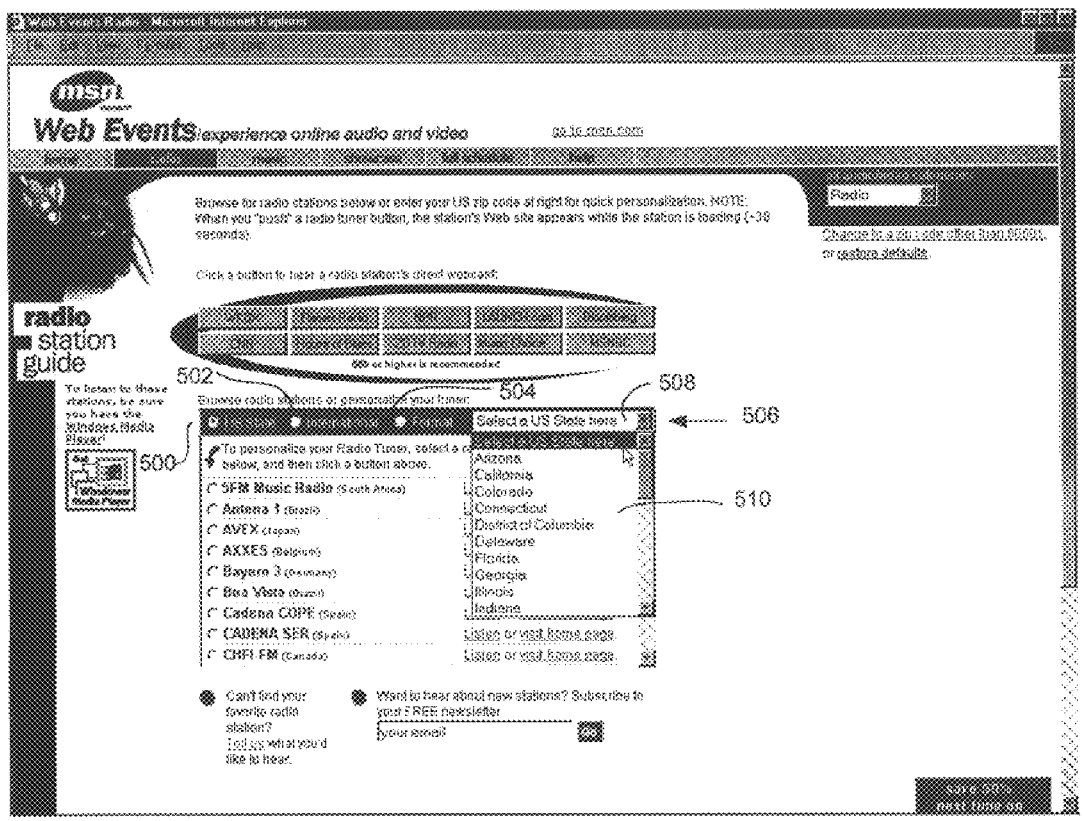
FIG. 5 depicts the Web page of FIG. 4 after a user has selected the "US State" radio button and clicked on the list box of menu entries for "US State;"
Figure 6:
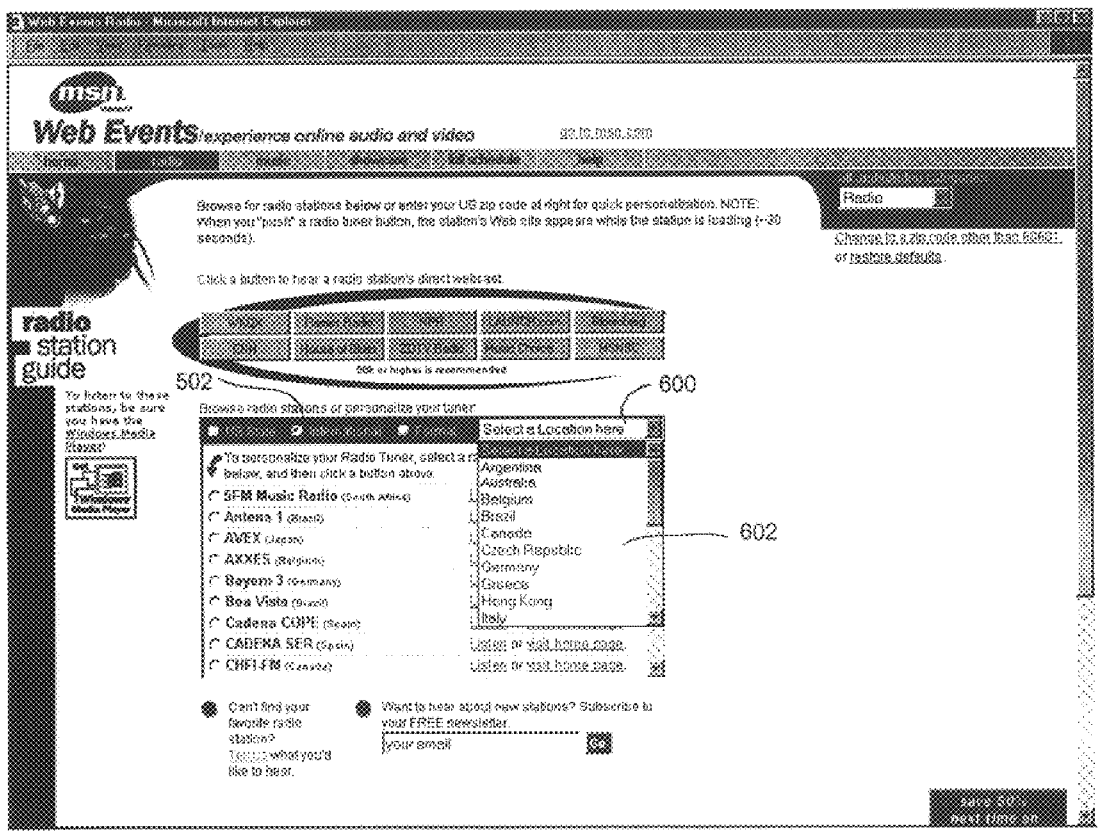
FIG. 6 shows the Web page of FIG. 4 after a user has selected the "International" radio button and clicked on the list box of menu entries for "International;"
Figure 7:
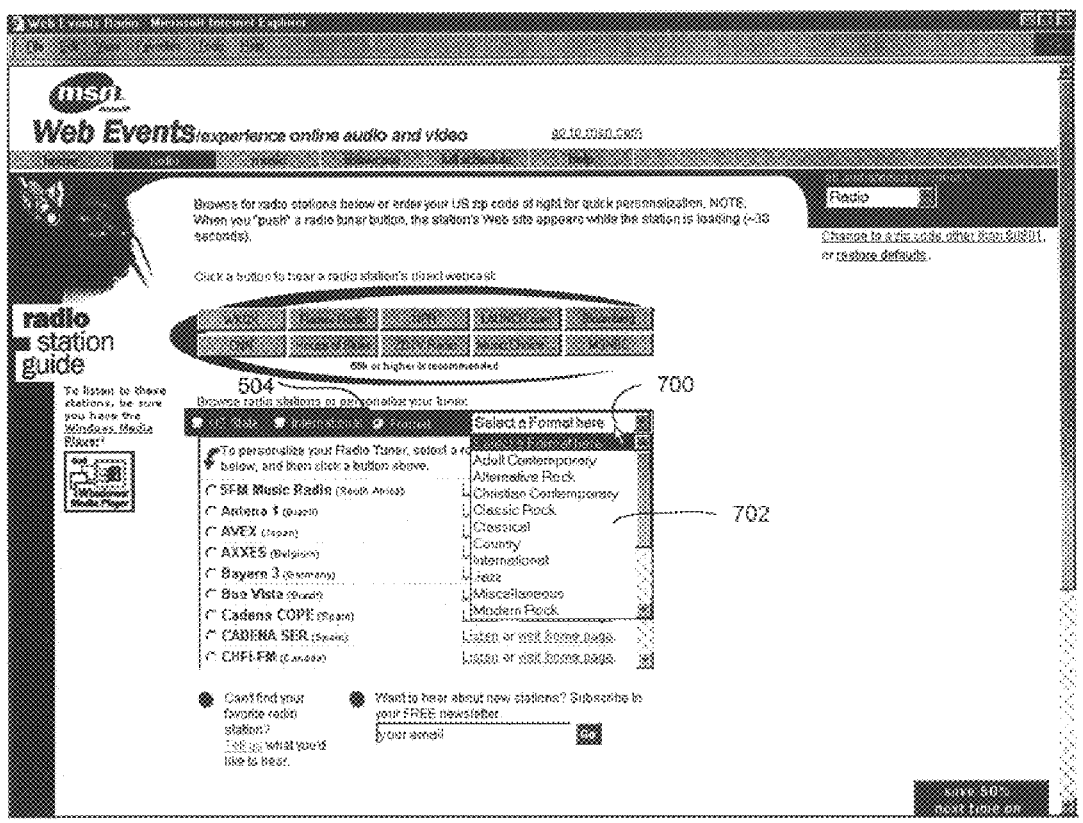
FIG. 7 illustrates the Web page of FIG. 4 after a user has selected the "Format" radio button and clicked on the list box of menu entries for "Format;"

As illustrated in FIGS. 5–7, the Web page 200 also contains radio buttons 500, 502 and 504, which are displayed in a header row 506. These radio buttons allow users to browse radio stations by US State 500, International 502 or Format 504. For example, when the US State radio button 500 is selected, a user can click on drop-down list box 508. A drop-down list of available states 510 is displayed. In this example, the drop-down list of available states 510 includes: Arizona, California, Colorado, Connecticut, District of Columbia, Delaware, Florida, Georgia, Illinois, Indiana, Kansas, Kentucky, Louisiana, Massachusetts, Maryland, Michigan, Missouri, North Carolina, Nebraska, New York, Ohio, Oklahoma, Oregon, Pennsylvania, Rhode Island, South Carolina, Tennessee, Texas, Utah, Washington, Wisconsin and West Virginia. However, any one or more of these states as well as any other state could be included in this list 510.

Similarly, when the International radio button 502 is selected, a user can click on drop-down list box 600 and a drop-down list of available countries 602 is displayed. The drop-down list of available countries 602, in this example, includes: Argentina, Australia, Belgium, Brazil, Canada, Czech Republic, Germany, Greece, Hong Kong, Italy, Japan, Korea, Latvia, Mexico, Portugal, Sénégal, South Africa, Spain, Switzerland, Taiwan, Turkey, United Kingdom and United States. Again, any one or more of these countries as well as any other country in the world could be included in this list 602.

Lastly, when the Format radio button 504 is selected, a user can click on drop-down list box 700 and a drop-down list of available musical formats 702 is displayed. Here, the drop-down list of available musical formats 702 includes: Adult Contemporary, Alternative Rock, Christian Contemporary, Classic Rock, Classical, Country, International, Jazz, Miscellaneous, Modern Rock, News Radio, Oldies, Sports Radio, Talk Radio, Top 40 and Urban. As before, any one or more of these musical formats as well as any other music format could be included in this list 702.

Figure 8:
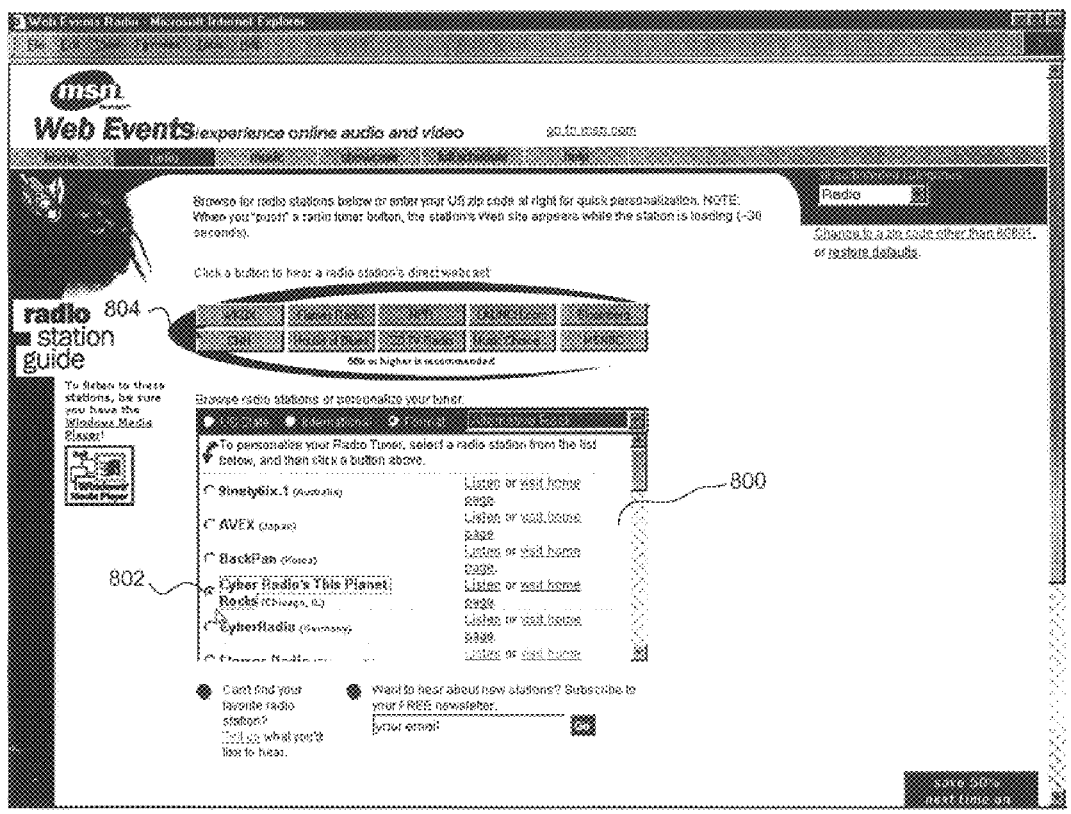
FIG. 8 depicts the Web page of FIG. 4 after a user has performed a search for Format/Alternative Rock and has selected the "Cyber Radio's This Planet Rocks" radio button.

After a user selects one of the US State 500, International 502 or Format 504 radio buttons and also selects one of the available items in one of the corresponding drop-down lists 510, 602 and 702, then the Web browser identifies the selections made by the user. The user's selection criteria are transmitted from the local computer to the server hosting the Web page 200. The server will search its memory or a database in order to identify radio stations matching the user's selection criteria. An HTML list of these radio stations will then be returned to the Web browser and displayed on the Web page 200. FIG. 8 provides an illustration of this. As shown, a user has selected the Format radio button 504 and has chosen Alternative Rock for the musical formal. In return, the server identified radio stations matching these criteria and displayed the results on the Web page 200.

Preferably, the Web page 200 displays the search results in an IFRAME 800. An "IFRAME" is a block element and functions as a document within a document, or like a floating FRAME. IFRAMES are available in HTML and script as of Microsoft® Internet Explorer 3.0 and later. By displaying the search results in an IFRAME 800, there is no need for the Web browser to regenerate and replot the entire Web page 200. Only the contents of the IFRAME 800 are modified. Because only the contents of the IFRAME are modified, only these contents are sent from the server to the Web browser. In other words, the entire Web page 200 is not resent. Thus, the download time is minimized as well.

Figure 10:
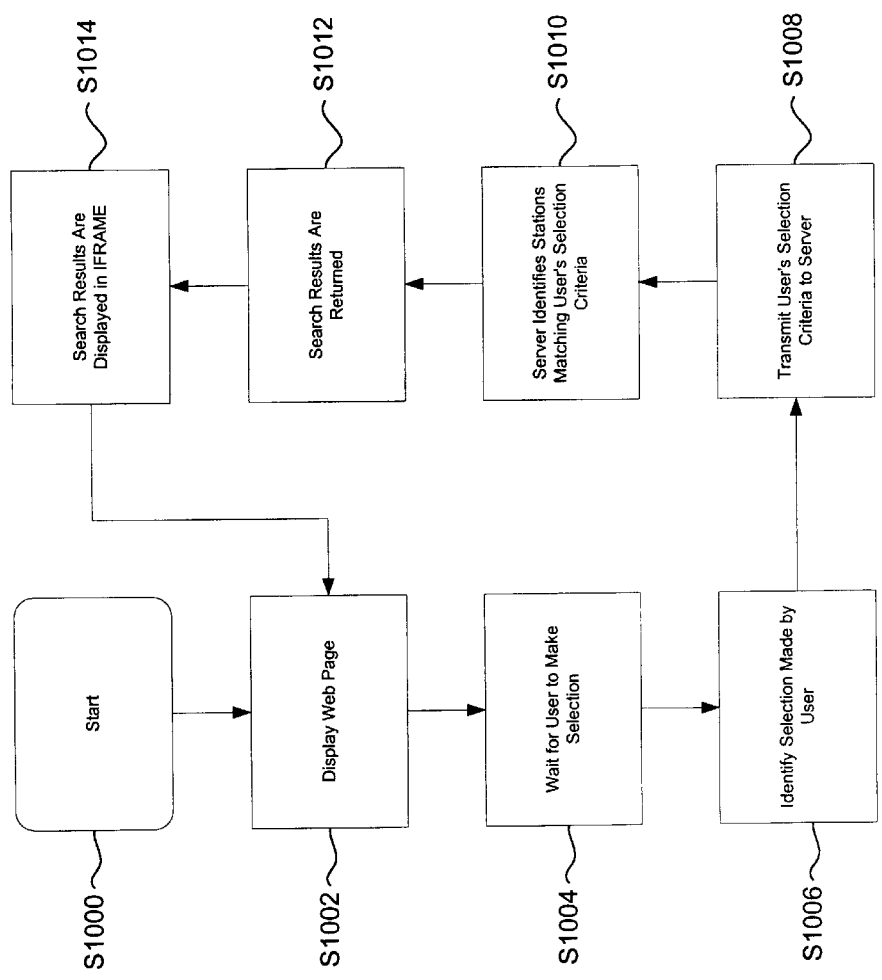
FIG. 10 is a flow diagram illustrating an exemplary process of identifying radio stations to display in an IFRAME on the Web page.

FIG. 10 shows a detailed a flow diagram for this exemplary process of identifying the radio-station search results to be displayed in the IFRAME 800 on the Web page 200. After the Web browser is started S1000 and the Web page is displayed S1002, the Web browser waits for the user to make a selection S1004. After a selection is made S1004, a JavaScript function (detailed below) identifies the selection (s) made by the user S1006. The Web browser then transmits the user's selection criteria to the server hosting the Web page S1008. The server next searches a database or its own server memory to identify radio stations that match the user's selection criteria S1010. The search results are then returned to the Web browser S1012. Preferably, the search results are returned in HTML format. The Web browser next displays the search results, preferably in an IFRAME on the Web page S1014. In sum, this process and the use of an IFRAME substantially increases performance of this system.

Figure 9:
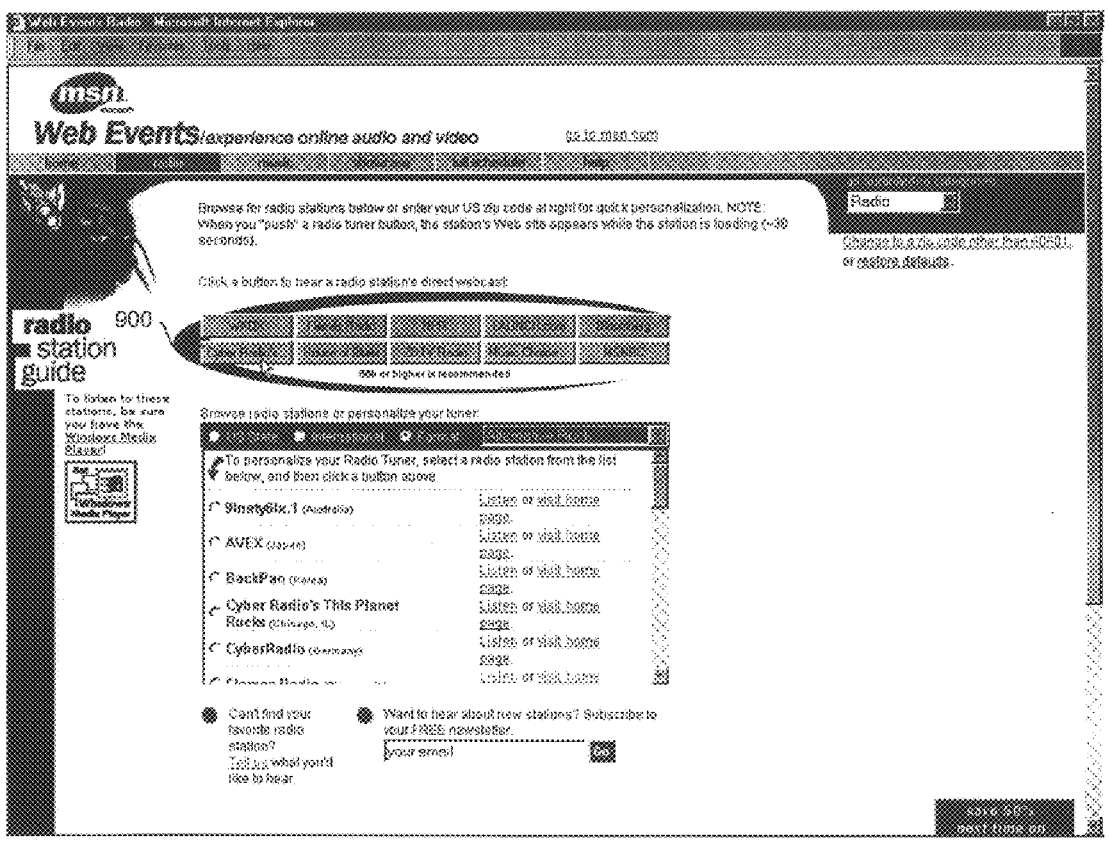
FIG. 9 shows the Web page of FIG. 8 after a user has assigned the URL for the "Cyber Radio's This Planet Rocks" radio station to the button formerly assigned to "CNN;"

FIGS. 8 and 9 illustrate another capability of the present invention—the ability to assign radio station URLs to preset-tuner buttons 202 after search results have been returned. As shown in FIG. 8, a radio button is adjacent to each radio station displayed in the IFRAME 800. If a user would like to assign the URL for the "Cyber Radio's This Planet Rocks" radio station to the preset-tuner radio button currently assigned to CNN 804, the user first clicks on the radio button for "Cyber Radio's This Planet Rocks" 802. Next, the user clicks on the CNN preset-tuner button 804. As depicted in FIG. 9, the URL for the "Cyber Radio's This Planet Rocks" radio station is then assigned to the radio button 900. The button 900 is next relabeled to reflect the new URL assignment for the button 900. This method can be used to assign any URL to any radio button or any other graphical object. Of course, skilled artisans will readily appreciate that the present invention is not limited to "radio buttons"—any graphical object could be utilized.

The present invention has yet another unique feature—namely the ability to remember each user's individual preferences and present-tuner-radio-button assignments. This is accomplished by storing the relevant preferences and assignments on the local computer in the form of a cookie data structure. A "cookie" is a message (code string) given to a Web browser by a Web server. The Web browser stores the message in a text file on a computer-readable medium either on the local computer or on a remote site. The message is then sent back to the server each time the Web browser requests a Web page from the server.

Figure 11:
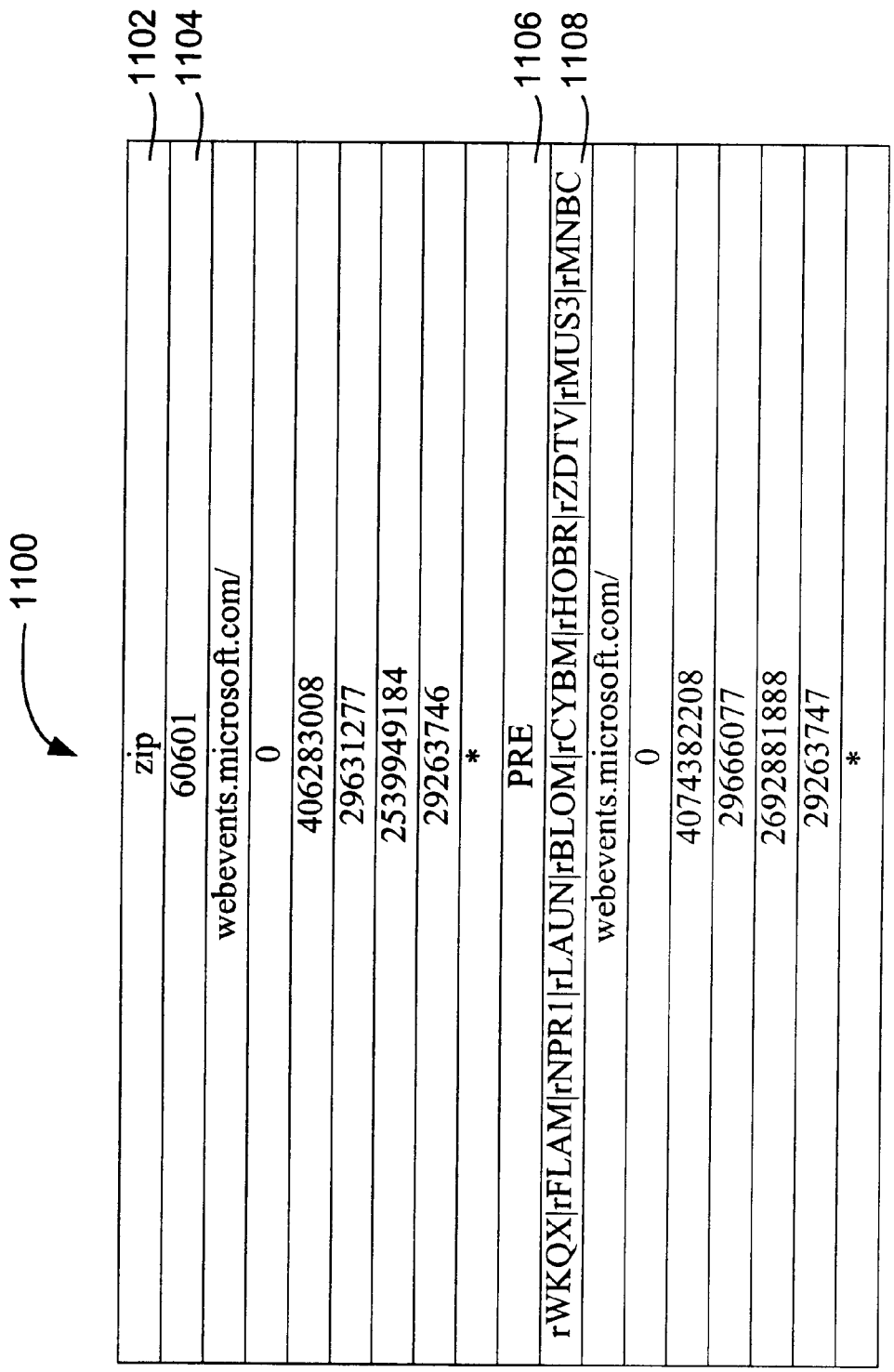
FIG. 11 shows various data fields contained in an exemplary cookie data structure that stores a user's zip code and radio station preferences.

With respect to the present invention, FIG. 11 shows various data fields contained in an exemplary cookie data structure 1100 that stores a user's zip code and radio station preferences. In the example shown in FIG. 11, data fields 1102 and 1104 in the cookie 1100 identify one stored variable as the zip code. This is denoted by the word "zip" in a data field stored in a first region of a range of memory addresses and is followed by the actual zip code "60601" that is stored in a second region of a second range of memory addresses. Similarly, data fields 1106 and 1108 identify the user's radio-station preferences for the preset-tuner buttons 202. This is denoted by the word "PRE" in a third data field stored in a third region of a third range of memory address and is followed by the radio-station preferences: rWKQX|rFLAM|rNPR1|rLAUN|rBLOM|rCYBM|rHOBR|rZDTV|rMUS3|rMNBC. This is the actual cookie data structure for the Web page 200 and button assignments depicted in FIG. 9. Thus, the server uses the information contained in the cookie data structure 1100 in order to assign URLs to the preset-tuner buttons each time the Web page 200 is by the Web browser.

In order to provide skilled artisans with a detailed example of the present invention, the HTML source code for the Web page shown in FIGS. 2–9 is set forth in Appendix A and the "radio.asp" active server page referened in the HTML source code is set forth in Appendix B. However, it should be understood that the present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit and scope of the invention. The specification and drawings are, therefore, to be regarded in an illustrative rather than restrictive sense. Accordingly, it is not intended that the invention be limited except as may be necessary in view of the appended claims.

MS Ref. No. 135544.1
B&W Case No. 3797.80188

<u>Appendix A</u>

```
    <html>
    <head>
    <!--TOOLBAR_EXEMPT-->

<META HTTP-EQUIV="PICS-Label" CONTENT='(PICS-1.1
    "http://www.rsac.org/ratingsv01.html" l comment "RSACi North America Server" by
    "inet@microsoft.com" r (n 0 s 0 v 0 l 0))'>
    <META NAME="MS.LOCALE" CONTENT="EN-US">
    <META HTTP-EQUIV="Content-Type" CONTENT="text/html;charset=iso-8859-1">
    <!--TOOLBAR_EXEMPT-->
    <!--h001-->
    <script SRC="/chan/chan.js" language="Javascript"></script>

<link REL="STYLESHEET" TYPE="text/css" HREF="/chan/webevents/wechan.css">

    <style>a:hover{color:#FF3300}</style>
    <title>Web Events Radio</title>

<style TYPE="text/css">
    <!--
    .RBUnselected
    {
            FONT-SIZE:9pt;
            BACKGROUND-COLOR:#d3d3d3;
            BORDER-BOTTOM:#696969 solid thin;
30          BORDER-LEFT:#f5f5f5 solid thin;
            BORDER-RIGHT:#696969 solid thin;
            BORDER-TOP:#f5f5f5 solid thin;
            WIDTH:86;
            HEIGHT:23;
35  }
    .RBSelected
    {
            FONT-SIZE:9pt;
            BACKGROUND-COLOR:#ff0000;
            COLOR:#ffffff;
            BORDER-BOTTOM-COLOR: #ff0000;
            BORDER-BOTTOM-STYLE: none;
            BORDER-LEFT-COLOR: #ff0000;
            BORDER-LEFT-STYLE: none;
            BORDER-RIGHT-COLOR: #ff0000;
            BORDER-RIGHT-STYLE: none;
```

MS Ref. No. 135544.1
B&W Case No. 3797.80188

```
            BORDER-TOP-COLOR: #ff0000;
            BORDER-TOP-STYLE: thin;
            WIDTH:86;
            HEIGHT:23;
        }
        -->
        </style>
        <script Language="JavaScript">

        var CurrentButton
        var ObjTuner
        var RType = "1"
        var RZip = ""
        var searchstr = "AR"
        var Mode = "play"
        var NewPre = null
        var today = new Date()
        var expiration = new Date(today.getTime() + 2000 * 24 * 60 * 60 * 1000); //2000 days from
        today
        var IE3 = false
        var IE4 = false
        var IE5 = true
        var NS4 = false
        var NS3 = false
        var Win32 = true
        var MAC = false var St = new Array()
        var Co = new Array()
        var Fo = new Array()

var Pre = new Array()
        Pre[0]="rVIR2"
        Pre[1]="rCYBM"
        Pre[2]="rNPR1"
        Pre[3]="rLAUN"
        Pre[4]="rBLOM"
        Pre[5]="rCNN1"
        Pre[6]="rHOBR"
        Pre[7]="rZDTV"
        Pre[8]="rMUS3"
        Pre[9]="rMNBC"

        var hp = new Array()
        var asx = new Array()
```

MS Ref. No. 135544.1
B&W Case No. 3797.80188

```
hp[0]=""
asx[0]=""
hp[0]="http%3A%2F%2Fwww%2Eradiofreevirgin%2Ecom"
asx[0]="http%3A%2F%2Fwww%2Eradiofreevirgin%2Ecom%2Fmicrosoft%2Easx"
hp[1]=""
asx[1]=""
hp[1]="http%3A%2F%2Fwww%2Ecyber%2Dradio%2Ecom%2Fthisplanetrocks%2Ehtm"
asx[1]="http%3A%2F%2F208%2E133%2E73%2E201%2Frock%2Easx"
hp[2]=""
asx[2]=""
hp[2]="http%3A%2F%2Fwww%2Enpr%2Eorg%2F"
asx[2]="http%3A%2F%2Fwww%2Enpr%2Eorg%2Fwebevents%2Fnpr%2Easx"
hp[3]=""
asx[3]=""
hp[3]="http%3A%2F%2Fwww%2Elaunch%2Ecom%2Fradio%2Ffs%5Fstart%2Easp%3FVO%3DRAD5"
asx[3]="http%3A%2F%2Fwww%2Elaunch%2Ecom%2Fradio%2Fasx%2Flaunchex%2Easx"
hp[4]=""
asx[4]=""
hp[4]="http%3A%2F%2Fwww%2Ebloomberg%2Ecom%2Fwelcome%2Ehtml"
asx[4]="http%3A%2F%2Fwww%2Ebloomberg%2Ecom%2Fmc%5Flive%2Easx"
hp[5]=""
asx[5]=""
hp[5]="http%3A%2F%2Fwww%2Ebroadcast%2Ecom%2Fcnn%2Faudioselect%2F"
asx[5]="http%3A%2F%2Fwww%2Ebroadcast%2Ecom%2Fcnn%2Faudioselect%2Fcnn%2Easx"
hp[6]=""
asx[6]=""
hp[6]="http%3A%2F%2Fwww%2Ehob%2Ecom%2Finternetradio"
asx[6]="http%3A%2F%2Ftm%2Eintervu%2Enet%2Ftemplate%2Fsmirror%2Fivtemplates%2Fhouseofblues%2Fhob%2Easx%3Fstream%3D%27hobradio28%27%3Bxtn%3D%2Easx"
hp[7]=""
asx[7]=""
hp[7]="http%3A%2F%2Fwww%2Ezdnet%2Ecom%2Fzdtv%2Fradio%2F"
asx[7]="http%3A%2F%2Fwww%2Ezdnet%2Ecom%2Fzdtv%2Fradio%2Flisten%2Easx"
hp[8]=""
asx[8]=""
hp[8]="http%3A%2F%2Fwww%2Emusicchoicelive%2Ecom%2F"
asx[8]="http%3A%2F%2Ftm%2Eintervu%2Enet%2Ftemplate%2Fsmirror%2Fivtemplates%2Fmusicchoice%2Fmusicchoice3%5F28%2Easx"
hp[9]=""
asx[9]=""
hp[9]="http%3A%2F%2Fwww%2Emsnbc%2Ecom%2Fnews%2Fasx%2Faudio%2Fliveaudio%2Easp"
asx[9]="http%3A%2F%2Fwww%2Emsnbc%2Ecom%2Fnews%2Fasx%2Faudio%2F28%2FMSNBC%5Fie5radio%2Easx"
```

MS Ref. No. 135544.1
B&W Case No. 3797.80188

```
St[1]="AZ&Arizona"
St[2]="CA&California"
St[3]="CO&Colorado"
St[4]="CT&Connecticut"
St[5]="DC&District of Columbia"
St[6]="DE&Delaware"
St[7]="FL&Florida"
St[8]="GA&Georgia"
St[9]="IL&Illinois"
St[10]="IN&Indiana"
St[11]="KS&Kansas"
St[12]="KY&Kentucky"
St[13]="LA&Louisiana"
St[14]="MA&Massachusetts"
St[15]="MD&Maryland"
St[16]="MI&Michigan"
St[17]="MO&Missouri"
St[18]="NC&North Carolina"
St[19]="NE&Nebraska"
St[20]="NY&New York"
St[21]="OH&Ohio"
St[22]="OK&Oklahoma"
St[23]="OR&Oregon"
St[24]="PA&Pennsylvania"
St[25]="RI&Rhode Island"
St[26]="SC&South Carolina"
St[27]="TN&Tennessee"
St[28]="TX&Texas"
St[29]="UT&Utah"
St[30]="WA&Washington"
St[31]="WI&Wisconsin"
St[32]="WV&West Virginia"

Co[1]="AR&Argentina"
Co[2]="AU&Australia"
Co[3]="BE&Belgium"
Co[4]="BR&Brazil"
Co[5]="CA&Canada"
Co[6]="CZ&Czech Republic"
Co[7]="DE&Germany"
Co[8]="GR&Greece"
Co[9]="HK&Hong Kong"
Co[10]="IT&Italy"
Co[11]="JP&Japan"
Co[12]="KR&Korea"
Co[13]="LA&Latvia"
```

MS Ref. No. 135544.1
B&W Case No. 3797.80188

```
        Co[14]="MX&Mexico"
        Co[15]="PT&Portugal"
        Co[16]="SN&Sénégal"
        Co[17]="ZA&South Africa"
        Co[18]="ES&Spain"
        Co[19]="CH&Switzerland"
        Co[20]="TW&Taiwan"
        Co[21]="TR&Turkey"
        Co[22]="UK&United Kingdom"
        Co[23]="US&United States"

Fo[1]="AC&Adult Contemporary"
        Fo[2]="AR&Alternative Rock"
        Fo[3]="CC&Christian Contemporary"
        Fo[4]="CR&Classic Rock"
        Fo[5]="CL&Classical"
        Fo[6]="CO&Country"
        Fo[7]="IN&International"
        Fo[8]="JZ&Jazz"
        Fo[9]="MS&Miscellaneous"
        Fo[10]="MR&Modern Rock"
        Fo[11]="NR&News Radio"
        Fo[12]="OL&Oldies"
        Fo[13]="SR&Sports Radio"
        Fo[14]="TR&Talk Radio"
        Fo[15]="T4&Top 40"
        Fo[16]="UR&Urban"

function newSelect(num,itm,inlinecall){
                var src, txt
                RType = num
                if(IE3){
                        frames[0].location.replace("select.asp?RType=" + num + "&searchstr=" + searchstr)
                        document.cookie = "RTYPE=" + num + "; path=/;"
                        return
                }
                var match = 0
                var sel = document.refine.searchstr
40              if(num == 1){
                        src = St
                        txt = "US State"
                }else{
                        if(num == 2){
45                              src = Co
                                txt = "Location"
```

29

MS Ref. No. 135544.1
B&W Case No. 3797.80188

```
                }else{
                        src = Fo
                        txt = "Format"
                }
        }
        document.cookie = "RTYPE=" + num + "; path=/;"
        sel.options.length = src.length;
        sel.options[0].text = "Select a " + txt + " here"
        for(var i=1; i < src.length; i++) {
                var o = sel.options[i]
                o.value = src[i].substring(0, src[i].indexOf('&'))
                o.text = src[i].substring(src[i].indexOf('&')+1, src[i].length)
                if(o.value == "AR" && inlinecall) match = i
                if(o.value == itm){
                        match = i
                }
        }
        sel.selectedIndex = match;
}
function StartTuner(Bnum){
        if (Mode=="play"){
                if(Pre[Bnum]!=""){
                        if(IE4 && Win32){
                                objTuner = window.open("/Radio/Tuner.asp?code=" + Pre[Bnum]
+ "&btn=" + Bnum + "&Pre=" + GetPresets() + "&zip=" +
RZip,"Tuner","width=528,height=224,toolbar=no,status=no,top=100,left=50",1)
                        }else{
                                if(IE5) {
                                        location.href = unescape("vnd.ms.radio:" + asx[Bnum])
                                }else{
                                        location.href = unescape(asx[Bnum])
                                }
                        }
                }else{
                        return
                }
                CurrentButton = Bnum
                if(hp[Bnum]!=null) var tmout = window.setTimeout("jumpTo();",4000)
        }else{
                SetPreset(Bnum)
        }
} function jumpTo(){
        location.href = unescape(hp[CurrentButton])
```

MS Ref. No. 135544.1
B&W Case No. 3797.80188

```
            } function Reload(){
                    location.href = "radio.asp"
            } function SetPreset(Bnum){
                    var p1,code
                    var thisBut = document.presets.elements[Bnum]
10                  code = NewPre
                    thisBut.value = ""
                    Pre[Bnum] = code
                    setCookie("PRE",GetPresets())
                    tmout = window.setTimeout("Reload();",100)
15          } function GetPresets(){
                    var t = ""
                    for(var i = 0; i <= 9; i++){
20                          t = t + Pre[i] + "|"
                    }
                    t = t.substring(0,t.length-1)
                    return t
            }
25
            function DoSearch(){
                    var srch
                    if(IE3){
                            srch =
            frames[0].searchstr.options[frames[0].searchstr.options.selectedIndex].value if(frames[0].searchstr.selectedIndex!=0)top.frames[1].location.replace("results.asp?RTyp
            e=" + RType + "&searchstr=" + srch)
                    }else{
                            srch =
            document.refine.searchstr.options[document.refine.searchstr.options.selectedIndex].value if(document.refine.searchstr.selectedIndex!=0)top.frames[0].location.replace("results.asp
            ?RType=" + RType + "&searchstr=" + srch)
40                  }
                    document.cookie = "SEARCHSTR=" + srch + "; path=/;"
            } function setCookie(cName, Props) {
45                  document.cookie = cName + "=" + Props + "; path=/; expires=" +
            expiration.toGMTString()
```

31

MS Ref. No. 135544.1
B&W Case No. 3797.80188

```
        DocCook = document.cookie;
} function ClearCookie (name) {
        document.cookie = name + "=" + "; expires=Tue, 01-Jan-80 00:00:01 GMT; path=/"
} function getCookie(CookieName) {
        var DocCook = document.cookie
        var index = DocCook.indexOf(CookieName + "=");
        if (index == -1) return "";
        index = DocCook.indexOf("=", index) + 1;
        var endstr = DocCook.indexOf(";", index);
        if (endstr == -1) endstr = DocCook.length;
        var cookie = unescape(DocCook.substring(index, endstr));
        if (cookie == null || cookie == "null" || cookie == "" || cookie.indexOf("undefined") >= 0 ||
cookie.lastIndexOf("=") == cookie.length - 1) {
                cookie = ""
        }
        return cookie
} function Verify(frm){
        var z = frm.zip.value
        if(z.length != 5 || (parseInt(z).toString() != z && z.substring(0,1) != "0")){
                alert("To personalize by zipcode, enter a valid zipcode in the text box and click
Go.")
                return false
        }
        var fnd = false
        for(var i = 0; i <= 4; i++){
                if (Pre[i] != "")fnd = true
        }
        if (fnd) {
                if(confirm("This will change up to five presets in the top row.")){
                        document.cookie = "OVERRIDE=T; path=/"
                        return true
                }else{
                        return false
                }
        }
        document.cookie = "OVERRIDE=T; path=/"
        return true
} function ClearAllCookies(){
```

MS Ref. No. 135544.1
B&W Case No. 3797.80188

```
                if(confirm("This will restore the original Radio Station Guide default stations. Do you
        want to continue?")){
                        ClearCookie("zip")
                        ClearCookie("PRE")
                        location.href = "default.asp"
                }
        } function newCat(o,s) {
10              var catcode;
                catcode = o.options[s].value;
                if(catcode != "") {
                        top.location.href = "/OnDemand/OnDemand.asp?Cat=" + catcode;
                }
15      }

</script>
        </head>

20      <body bgcolor="#FFFFFF" text="#000000" link="#000066" vlink="#808080" alink="#FF3300"
        topmargin="0" leftmargin="0">
        <basefont FACE="ARIAL,SANS-SERIF" SIZE="2">

<!--TOOLBAR_EXEMPT-->
        <!--tb001-->
        <a NAME="Top" HREF="null.asf"></a>

<table bgcolor="#FFFFFF" cellpadding="0" cellspacing="0" border="0"
        width="100%"><tr><td>
        <table BORDER="0" CELLSPACING="0" CELLPADDING="0" WIDTH="608"><tr><td><a
        HREF="http://go.msn.com/npl/msnt.asp" target="_top">

<img SRC="/chan/webevents/logo_min.gif" WIDTH="118" HEIGHT="40" BORDER="0"
        ALT="go to msn.com" VSPACE="5"></a></td>

</tr></table>

<table BORDER="0" CELLSPACING="0" CELLPADDING="0" WIDTH="608"><tr>
        <td valign="bottom" nowrap><nobr>      <img
        src="/images/ttlWebEvents.GIF" width="156" height="25"
        align="absbottom">/<B><I>experience online audio and video</I></B></nobr></td>
        <td align="right" width="150">

                <a HREF="http://go.msn.com/npl/msnp.asp" CLASS="msn" TARGET="_top">go to
        msn.com</a>
```

33

MS Ref. No. 135544.1
B&W Case No. 3797.80188

```
    </td>
    </tr>
    <tr><td colspan="3" height="5"><img src="/images/ts.gif" height="5" width="9"></td></tr>
5   </table>

</tr></td></table>

10
    <!-- add nav bar here -->
    <!---->

15  <!--start toolbar-->
    <script language="javascript">
    function mOvr(src) { if (!src.contains(event.fromElement)){src.bgColor =
    '#000066';src.children(0).style.color='#FFCC66'}}
    function mOut(src) { if (!src.contains(event.toElement)) {src.bgColor =
20  '#CCCCFF';src.children(0).style.color='#000066'}}
    </script>
    <table cellpadding="0" cellspacing="0" width="100%" height="17"><tr>

<td align="center" bgcolor="#CCCCFF" width="100" onmouseover="mOvr(this);"
25  onmouseout="mOut(this);" onclick="location.href='/default.asp'" class="TC"><a target="_top"
    href="/default.asp" class="TL"><b>home</b></a></td>
            <td align="center" bgcolor="#000066" width="100"
    onclick="location.href='/radio/radio.asp'" class="TC"><a target="_top" href="/radio/radio.asp"
    class="TL" style="color:#FFCC66"><b>radio</b></a></td>
30          <td align="center" bgcolor="#CCCCFF" width="100"
    onmouseover="mOvr(this);" onmouseout="mOut(this);"
    onclick="location.href='/ondemand/ondemand.asp?cat=mu'" class="TC"><a target="_top"
    href="/ondemand/ondemand.asp?cat=mu" class="TL"><b>music</b></a></td>

35          <td align="center" bgcolor="#CCCCFF" width="100"
    onmouseover="mOvr(this);" onmouseout="mOut(this);"
    onclick="location.href='/showcase/showcase.asp'" class="TC"><a target="_top"
    href="/showcase/showcase.asp" class="TL"><b>showcase</b></a></td>
            <td align="center" bgcolor="#CCCCFF" width="100"
40  onmouseover="mOvr(this);" onmouseout="mOut(this);"
    onclick="location.href='/fullschedule/fullschedule.asp'" class="TC"><a target="_top"
    href="/fullschedule/fullschedule.asp" class="TL"><b>full schedule</b></a></td>
            <td align="center" bgcolor="#CCCCFF" width="100"
    onmouseover="mOvr(this);" onmouseout="mOut(this);" onclick="location.href='/help/help.asp'"
    class="TC"><a target="_top" href="/help/help.asp" class="TL"><b>help</b></a></td>
```

MS Ref. No. 135544.1
B&W Case No. 3797.80188

```
                <td bgcolor="#CCCCFF" width="100%"> </td></tr>
                <tr><td height="2"><img src="/images/ts.gif" width="100" height="2"></td><td
height="2"><img src="/images/ts.gif" width="100" height="2"></td><td height="2"><img
src="/images/ts.gif" width="100" height="2"></td><td><img src="/images/ts.gif" width="100"
height="2"></td><td><img src="/images/ts.gif" width="100" height="2"></td><td><img
src="/images/ts.gif" width="100" height="2"></td><td><img src="/images/ts.gif" width="9"
height="2"></td></tr>

</table>
        <!--end toolbar-->

<table WIDTH="100%" CELLPADDING="0" CELLSPACING="0" BORDER="0">
            <tr>
                <!-- LEFT COLUMN BEGIN-->
                <td WIDTH="154" VALIGN="top" ALIGN="left">
                    <table CELLPADDING="0" CELLSPACING="0" BORDER="0">
                        <tr><td BGCOLOR="#000066"><img
SRC="/images/imgRA.JPG" WIDTH="154" HEIGHT="126"></td></tr>
                        <tr><td><img SRC="/images/ttlRadio.GIF" WIDTH="154"
HEIGHT="77" alt="Radio Station Guide"></td></tr>
                    </table>

<table HEIGHT="100%" CELLPADDING="0" CELLSPACING="0"
BORDER="0">
                        <tr>
                            <td WIDTH="43" BGCOLOR="#000066"><img
SRC="/images/ts.gif" HEIGHT="275" WIDTH="43"></td>
                            <td WIDTH="10"> </td>
                            <td valign="top">
                                <font face="Arial,Verdana,Helvetica" size="1">
                                To listen to these stations, be sure you have the <a
href="http://www.microsoft.com/windows/mediaplayer/download/default.asp">Windows Media
Player</a>!<br>
                                <a
href="http://www.microsoft.com/windows/mediaplayer/download/default.asp"><img
src="/images/getmediaplayer.gif" vspace="5" BORDER="1" ALT="Get Windows Media
Player" WIDTH="65" HEIGHT="57"></a><br><br><br><br>

</font>
                            </td>
                        </tr>
                    </table>
                </td>
                <!--LEFT COLUMN END -->
```

MS Ref. No. 135544.1
B&W Case No. 3797.80188

```
                    <!--RIGHT COLUMN BEGIN -->
                    <td VALIGN="top">

<table CELLPADDING="0" CELLSPACING="0" BORDER="0">
                                <tr>
                                    <td WIDTH="100%" rowspan="2" valign="top">
                                        <table WIDTH="100%" CELLPADDING="0" CELLSPACING="0" BORDER="0">
                                            <tr>
                                                <td VALIGN="top" WIDTH="100%" HEIGHT="6" BGCOLOR="#000066"><img SRC="/images/ts.gif" HEIGHT="6" ALIGN="top"></td>
                                                <td VALIGN="top" WIDTH="25" rowspan="2"><img SRC="/images/imgShellCurve.GIF" WIDTH="25" HEIGHT="41" ALIGN="top"></td>
                                            </tr>
                                            <tr><td WIDTH="100%">
                                                <table cellpadding="0" cellspacing="0" BORDER="0"><tr><td WIDTH="24"> </td><td>
                                                    <br><font face="Arial,Helvetica" size="2" class="weMainTxt">Browse for radio stations below or enter your US zip code at right for quick personalization.
                                                    NOTE: When you "push" a radio tuner button, the station's Web site appears while the station is loading (~30 seconds).<br></font>
                                                </td></tr></table>
                                            </td></tr>
                                        </table>
                                    </td>

<td WIDTH="232" BGCOLOR="#000066">
                                        <table CELLPADDING="0" CELLSPACING="0" BORDER="0">
                                            <tr>
                                                <td><img SRC="/images/ts.gif" WIDTH="10" HEIGHT="1" ALIGN="left"></td>
                                                <td WIDTH="222"><font face="Arial,Helvetica" size="2" color="#ffcc66" class="weYellowTxt">all audio/video categories</font></td>
                                            </tr>
                                            <tr>
                                                <td><img SRC="/images/ts.gif" WIDTH="10" HEIGHT="9"></td>
                                                <td height="30" WIDTH="222" nowrap>
```

MS Ref. No. 135544.1
B&W Case No. 3797.80188

```
                                                                <form id="Cat"
NAME="Cat" ACTION="/OnDemand/ondemand.asp" METHOD="get">
                                                                <select id="Cat"
NAME="Cat" SIZE="1" onchange="newCat(this,this.selectedIndex);">
                                                                        <option
        VALUE="AR" >Art</option>

<option
        VALUE="BU" >Business</option>

<option
        VALUE="CO" >Computers</option>

<option
        VALUE="ED" >Educational</option>

<option
        VALUE="EN" >Entertainment</option>

<option
        VALUE="IL" >International</option>

<option
        VALUE="HL" >Lifestyle</option>

<option
        VALUE="MO" >Movies</option>

<option
        VALUE="MU" >Music</option>

<option
        VALUE="NW" >News</option>

<option
        VALUE="RA"  SELECTED>Radio</option>

<option
        VALUE="ST" >Sci-Tech</option>

<option
        VALUE="SH" >Shopping</option>

<option
        VALUE="SP" >Sports</option>
```

MS Ref. No. 135544.1
B&W Case No. 3797.80188

```
                                                                <option
VALUE="TV" >TV</option>
                                                                <option
VALUE="WC" >Webcam</option>
                                                        </select>
                                                    </form><!---->
                                            </td>
                                        </tr>
                                    </table>
                                </td>
                            </tr>
                            <tr>
                                <td align="right">
                                    <table cellpadding=0 cellspacing=0
width="225"><tr><td height="30">
                                        <form onsubmit="return
Verify(this);"> <input TYPE="text" NAME="zip" SIZE="10" MAXLENGTH="5"
VALUE="   enter zip"> <input TYPE="IMAGE" SRC="/images/Go_red.GIF" alt="GO"
BORDER="0" ALIGN="absmiddle" WIDTH="25" HEIGHT="21">
                                        </form><!---->
                                    </td></tr></table>
                                </td>
                            </tr>
                        </table>
                        <form name="presets" style="margin-bottom:-20px;margin-top:3px">
                            <table cellpadding="0" cellspacing="0"><tr><td
WIDTH="24"> </td><td><font face="Arial,Helvetica" size="2" class="weMainTxt"
color="#FF3300">Click a button to hear a radio station's direct
webcast:</font></td></tr></table>
                            <div STYLE="BACKGROUND-
IMAGE:url(/images/bkgSwooshB.gif);BACKGROUND-REPEAT:no-repeat">
                                <table CELLPADDING="0" CELLSPACING="0" height="95"
width="466">
                                    <tr>
                                        <td WIDTH="24"><img src="/images/ts.gif" width="24"
height="95"></td>
                                        <td>
                                            <table CELLPADDING="0" CELLSPACING="2"
BORDER="0" width="100%">
                                                <tr><td COLSPAN="5"><img
SRC="/images/ts.gif" WIDTH="438" HEIGHT="7"></td></tr>
```

MS Ref. No. 135544.1
B&W Case No. 3797.80188

```
                                        <tr>

<td WIDTH="20%" align="center">
                        <input type="button" ID="btn0" onclick="StartTuner(0);" value="R. Free Virgin"
title="Radio Free Virgin (Alternative Rock)" CLASS="RBUnselected" ALIGN="center"
VALIGN="middle">
                        </td>

<td WIDTH="20%" align="center">
                        <input type="button" ID="btn1" onclick="StartTuner(1);" value="Cyber
Radio's..." title="Cyber Radio's This Planet Rocks (Alternative Rock)"
CLASS="RBUnselected" ALIGN="center" VALIGN="middle">
                        </td>

<td WIDTH="20%" align="center">
                        <input type="button" ID="btn2" onclick="StartTuner(2);" value="   NPR   "
title="NPR National Public Radio (News Radio)" CLASS="RBUnselected" ALIGN="center"
VALIGN="middle">
                        </td>

<td WIDTH="20%" align="center">
                        <input type="button" ID="btn3" onclick="StartTuner(3);"
value="LAUNCH.com" title="Launch.com's LaunchCast (Miscellaneous)"
CLASS="RBUnselected" ALIGN="center" VALIGN="middle">
                        </td>

<td WIDTH="20%" align="center">
                        <input type="button" ID="btn4" onclick="StartTuner(4);" value="Bloomberg"
title="Bloomberg (News Radio)" CLASS="RBUnselected" ALIGN="center"
VALIGN="middle">
                        </td>

</tr>
                                        <tr>

<td WIDTH="20%" align="center">
                        <input type="button" ID="btn5" onclick="StartTuner(5);" value="   CNN   "
title="CNN (News Radio)" CLASS="RBUnselected" ALIGN="center" VALIGN="middle">
                        </td>

<td WIDTH="20%" align="center">
                        <input type="button" ID="btn6" onclick="StartTuner(6);" value="House of
Blues" title="House of Blues Internet Radio (Modern Rock)" CLASS="RBUnselected"
ALIGN="center" VALIGN="middle">
                        </td>
```

MS Ref. No. 135544.1
B&W Case No. 3797.80188

```
                       <td WIDTH="20%" align="center">
                       <input type="button" ID="btn7" onclick="StartTuner(7);" value="ZDTV Radio"
title="ZDTV Radio (News Radio)" CLASS="RBUnselected" ALIGN="center"
VALIGN="middle">
                       </td>

<td WIDTH="20%" align="center">
                       <input type="button" ID="btn8" onclick="StartTuner(8);" value="Music Choice
..." title="Music Choice - 80s (Miscellaneous)" CLASS="RBUnselected" ALIGN="center"
VALIGN="middle">
                       </td>

<td WIDTH="20%" align="center">
                       <input type="button" ID="btn9" onclick="StartTuner(9);" value="MSNBC"
title="MSNBC (News Radio)" CLASS="RBUnselected" ALIGN="center" VALIGN="middle">
                       </td>

</tr>
                                         <tr><td COLSPAN="5"
align="center"><font size="1" face="arial">56k or higher is recommended</font></td></tr>
                                         </table>
                                   </td>
                             </tr>
                       </table>
                 </div>
           </form>

<form name="refine" ACTION="/radio/radio.asp" METHOD="GET"
STYLE="margin-bottom:0px;">
                 <table width="464" CELLPADDING="0" CELLSPACING="0">
                       <tr>
                             <td width="26"> </td>
                             <td>
                                   <table cellpadding="0" cellspacing="0"
height="25" border="0"><tr><td>
                                         <img SRC="/images/ts.gif" WIDTH="1"
HEIGHT="8"><br>
                                         <font face="Arial,Helvetica" size="2"
class="weMainTxt" color="#FF3300">Browse radio stations or personalize your
tuner:</font><br>
                                   </td></tr></table>
                                   <table width="438" cellspacing="0" BORDER="0"
bgcolor="#000066">
                                         <tr>
                                               <td><font face="Arial,Helvetica"
size="2" class="weMainTxt" color="#FFFFFF"><input name="RType" id="typ1"
```

MS Ref. No. 135544.1
B&W Case No. 3797.80188

```
        onclick="newSelect(1,'',false);" value="1" type="radio" checked> <label
        for="typ1">US State</label></font></td>
                                        <td><font face="Arial,Helvetica"
        size="2" class="weMainTxt" color="#FFFFFF"><input name="RType" id="typ2"
        onclick="newSelect(2,'',false);" value="2" type="radio" > <label
        for="typ2">International</label></font></td>
                                        <td><font face="Arial,Helvetica"
        size="2" class="weMainTxt" color="#FFFFFF"><input name="RType" id="typ3"
        onclick="newSelect(3,'',false);" value="3" type="radio" > <label
        for="typ3">Format</label></font></td>
                                        <td align="right">
                                                <select style="width:175"
        onchange="DoSearch();" name="searchstr">
                                                        <option
        selected>Select a Format here     </option>
                                                        <option>
                                                        <option>
                                                        <option>
                                                        <option>
                                                        <option>
                                                        <option>
                                                </select>

</td>
                                </tr>
                        </table>
                    </td>
                </tr>
            </table>
        </form>
        <script language="javascript">
        <!--
            var lastStr = getCookie("SEARCHSTR")
            if(lastStr.length > 0) {
                searchstr = lastStr
                RType = getCookie("RTYPE")
            } newSelect(RType, searchstr, true)

//-->
        </script>
                <table CELLPADDING="0" CELLSPACING="0" BORDER="0">
                    <tr>
                        <td width="27"> </td>
                        <td>
```

41

MS Ref. No. 135544.1
B&W Case No. 3797.80188

```
                                <iframe
src="results.asp?RType=1&searchstr=AR" width="438" height="226"></iframe>
                                        </td>
                                </tr>
                        </table>
                        <br>
                        <table CELLPADDING="0" CELLSPACING="0" BORDER="0"
width="464">
                                <tr>
                                        <td width="14"> </td>
                                        <td VALIGN="top"><img SRC="/images/icoWrite.gif"
WIDTH="38" HEIGHT="20"></td>
                                        <td VALIGN="top" CLASS="WEMaintxt">Can't find
your favorite radio station?<br><A HREF="mailto:WEFEED@Microsoft.com">Tell us</a>
what you'd like to hear.</td>
                                        <td VALIGN="top"><img SRC="/images/icoWrite.gif"
WIDTH="38" HEIGHT="20"></td>
                                        <td VALIGN="top" CLASS="WEMaintxt">
                                                <form ACTION="/NewsLetter/NewsLetter.asp"
METHOD="post">
                                                        Want to hear about new stations? Subscribe
to your FREE newsletter.<br>
                                                        <input TYPE="text" NAME="emailAdr"
SIZE="25" MAXLENGTH="100" VALUE="your email">
                                                        <input TYPE="IMAGE"
SRC="/images/Go_red.GIF" alt="GO" BORDER="0" NAME="SUBMIT" VALUE="Search"
ALIGN="absmiddle" WIDTH="25" HEIGHT="21">
                                                </form>
                                        </td>
                                </tr>
                        </table>
                        <a HREF="http://network.msn.com/snav/webevents.asp"
TARGET="_top"><img SRC="http://network.msn.com/snav/webevents.gif" WIDTH="130"
HEIGHT="80" BORDER="0" ALT="MSN.COM Network Promotion" HSPACE="10"
VSPACE="10" ALIGN="RIGHT"></a>
                </td>
        </tr>
</table>
</td></tr></table>

<table><tr><td></td></tr></table>

<script LANGUAGE="JavaScript">
<!--
```

MS Ref. No. 135544.1
B&W Case No. 3797.80188

```
if(navigator.userAgent.indexOf("Mac") > 0){
        document.write('<STYLE TYPE="text/css"><!--.bsl{font-size: 11pt;}.bql{font-size:
11pt;}.bbanpromo{font-size: 11pt;}.promo{font-size: 11pt;}--></STYLE>');
}
// -->
</script>
<table bgcolor="white" cellpadding="0" cellspacing="0" border="0" width="100%">
<tr>
<td>

<!--start toolbar-->
<script language="javascript">
function mOvr(src) { if (!src.contains(event.fromElement)){src.bgColor =
'#000066';src.children(0).style.color='#FFCC66'}}
function mOut(src) { if (!src.contains(event.toElement)) {src.bgColor =
'#CCCCFF';src.children(0).style.color='#000066'}}
</script>
<table cellpadding="0" cellspacing="0" width="100%" height="17"><tr>

<td align="center" bgcolor="#CCCCFF" width="100" onmouseover="mOvr(this);"
onmouseout="mOut(this);" onclick="location.href='/default.asp'" class="TC"><a target="_top"
href="/default.asp" class="TL"><b>home</b></a></td>
        <td align="center" bgcolor="#000066" width="100"
onclick="location.href='/radio/radio.asp'" class="TC"><a target="_top" href="/radio/radio.asp"
class="TL" style="color:#FFCC66"><b>radio</b></a></td>
        <td align="center" bgcolor="#CCCCFF" width="100"
onmouseover="mOvr(this);" onmouseout="mOut(this);"
onclick="location.href='/ondemand/ondemand.asp?cat=mu'" class="TC"><a target="_top"
href="/ondemand/ondemand.asp?cat=mu" class="TL"><b>music</b></a></td>

<td align="center" bgcolor="#CCCCFF" width="100"
onmouseover="mOvr(this);" onmouseout="mOut(this);"
onclick="location.href='/showcase/showcase.asp'" class="TC"><a target="_top"
href="/showcase/showcase.asp" class="TL"><b>showcase</b></a></td>
        <td align="center" bgcolor="#CCCCFF" width="100"
onmouseover="mOvr(this);" onmouseout="mOut(this);"
onclick="location.href='/fullschedule/fullschedule.asp'" class="TC"><a target="_top"
href="/fullschedule/fullschedule.asp" class="TL"><b>full schedule</b></a></td>
        <td align="center" bgcolor="#CCCCFF" width="100"
onmouseover="mOvr(this);" onmouseout="mOut(this);" onclick="location.href='/help/help.asp'"
class="TC"><a target="_top" href="/help/help.asp" class="TL"><b>help</b></a></td>

<td bgcolor="#CCCCFF" width="100%"> </td></tr>
        <tr><td height="2"><img src="/images/ts.gif" width="100" height="2"></td><td
height="2"><img src="/images/ts.gif" width="100" height="2"></td><td height="2"><img
```

43

MS Ref. No. 135544.1
B&W Case No. 3797.80188

```
src="/images/ts.gif" width="100" height="2"></td><td><img src="/images/ts.gif" width="100"
height="2"></td><td><img src="/images/ts.gif" width="100" height="2"></td><td><img
src="/images/ts.gif" width="100" height="2"></td><td><img src="/images/ts.gif" width="9"
height="2"></td></tr>

</table>
<!--end toolbar-->

<table BORDER="0" BGCOLOR="#FFFFFF" WIDTH="608">
<tr>
<td VALIGN="TOP" WIDTH="140">
<a HREF="http://go.msn.com/npl/msnb.asp" target="_top"><img
SRC="/chan/webevents/logo.gif" WIDTH="140" HEIGHT="60" BORDER="0" ALT="go to
msn.com"></a>
<p>
<center>
<table cellpadding="0" cellspacing="0" border="0">
<tr>
        <td width="10%"></td>
        <td><p class="bbanpromo">Do it Today on MSN. Stay in touch with FREE <A
HREF="http://go.msn.com/npl/hotmail.asp" TARGET="_top" CLASS=promo>Hotmail</a>--
from any PC with Internet access.</p></td>
        <td width="8%"></td>
</tr>
</table>
</center>
</td>
<td VALIGN="TOP" WIDTH="455">
<!--svc003-->

<SCRIPT LANGUAGE="javascript">
<!--
        wbsls();
// -->
</SCRIPT>

<table width="455" border="0" cellpadding="0" cellspacing="0"><tr><td height="1"
bgcolor="#999999"></td></tr></table>
<!--ql005-->

<SCRIPT LANGUAGE="JAVASCRIPT">
<!--
        wbqls();
// -->
</SCRIPT>
```

44

MS Ref. No. 135544.1
B&W Case No. 3797.80188

```
   <table width="455" border="0" cellpadding="0" cellspacing="0"><tr><td height="1"
   bgcolor="#999999"></td></tr></table>
   <table BORDER="0" WIDTH="455">
   <tr>
   <td WIDTH="88"><font FACE="ARIAL,SANS-SERIF" SIZE="3"
   COLOR="#FF9933">search<br>the web:</font></td>
           <td ALIGN="LEFT"><nobr><form STYLE="margin-top:9px; margin-bottom:9px;"
   ACTION="http://search.msn.com/results.asp" TARGET="_top" METHOD="GET"><input
   ID="MT" TYPE="TEXT" SIZE="32" MAXLENGTH="255" VCARD_NAME="SearchText"
   NAME="MT">  <input TYPE="IMAGE" SRC="/chan/search/go2.gif"
   BORDER="0" NAME="SUBMIT" VALUE="Search" ALT="Search the Web" WIDTH="17"
   HEIGHT="17"><input TYPE="HIDDEN" NAME="CO" VALUE="20"><input
   TYPE="HIDDEN" NAME="RS" VALUE="CHECKED"><input TYPE="HIDDEN"
   NAME="Form" VALUE="CF"><font FACE="ARIAL,SANS-SERIF"
   SIZE="1">  <a
   HREF="http://search.msn.com/advanced.asp?MT=&RS=CHECKED&CO=20&F
   orm=CF" TARGET="_top" CLASS="search">other searches</a></font></form></nobr></td>

   </tr>
   </table>
   <table width="455" border="0" cellpadding="0" cellspacing="0"><tr><td height="1"
   bgcolor="#999999"></td></tr></table>
   <FONT FACE="ARIAL,SANS-SERIF" SIZE=1 COLOR="#666666">
   <A HREF="http://go.msn.com/npl/terms.asp" TARGET="_top" CLASS=sys>Terms of
   Use</A>   <A HREF="http://go.msn.com/npl/msad.asp" TARGET="_top"
   CLASS=sys>Advertise</A>  <A HREF="http://go.msn.com/npl/privacy.asp"
   TARGET="_top"
   CLASS=sys>TRUSTe Approved Privacy Statement</A><br>
    © 1999 Microsoft Corporation. All rights reserved.
   </TD>
   </TR>
   </TABLE>
   </td>
   </tr>
   </table>

</body>
</html>
```

MS Ref. No. 135544.1
B&W Case No. 3797.80188

Appendix B

```
        <%
            Option Explicit
            Response.Buffer = True
            Response.Expires = 0
        %>

<html>
        <head>
        <META NAME="DESCRIPTION" CONTENT="The most comprehensive Internet directory of
        radio stations streaming on the Web using Windows Media™ Technologies.">
        <META NAME="KEYWORDS" CONTENT="radio,internet,Radio
        Stations,broadcast,stream,free,netradio,web,listen,RADIO,
        live,jukebox,classic rock,top 40,oldies,country,adult contemporary,alternative,modern ,talk
        radio,sports,
        international,classical,news,urban,christian ,jazz,miscellaneous">
        <!--TOOLBAR_EXEMPT-->
        <!--#include virtual="/INC/timedate.asp"-->
        <!--#include virtual="/chan/lib/browser.asp"-->
        <!--#include virtual="/inc/Global.inc"-->
        <!--#include virtual="/INC/msn_stats.inc"-->
        <!--#include virtual="/chan/webevents/head.asp"-->
        <title>Windows Media Guide Radio</title>
        <%If Not IE Then%>
                <!--#include file="results.inc"-->
        <%End If%>
        <%
        Dim I, J, K, a, s, s1, s2, s3, slot, Found, TopNum, pos, FriendlyName, ThisValue, searchstr
        Dim StationCodes, RType, RZip, HeaderText, ErrMessage, PresetsOK, Override, UsingDefaults
        Dim Page, NumStationCodes, StartStation, EndStation, NumPages, PageQS, Pre, aPre, BC,
        LocalStations
        Override = false
        If (NS3 And MAC) Or (IE3 And MAC) Then
                PresetsOK = false
        Else
                PresetsOK = true
        End If
        Pre = Request.Cookies("PRE")
        If Request.Cookies("OVERRIDE") = "T" Then
                setCookie "ZIP", null, Request.QueryString("zip")
                Response.Cookies("OVERRIDE") = "F"
                If Pre <> "" Then
                        Override = True
                Else
```

MS Ref. No. 135544.1
B&W Case No. 3797.80188

```
                    UsingDefaults = True
            End If
        End If

        RZip = Request.Cookies("ZIP")

If Pre <> "" Then
                aPre = Split(Pre, "|")
        Else
                aPre = Array("","","","","","","","","","")
        End If
        If RZip <> "" then
                LocalStations = Zip2Radio.LookupValue(left(RZip,2))
                If LocalStations <> "" Then
                        LocalStations = split(LocalStations, ",")
                        if Ubound(LocalStations) <= 4 Then
                                TopNum = Ubound(LocalStations)
                        Else
                                TopNum = 4
                        End If
                        For I = 0 to TopNum
                                If override or UsingDefaults or aPre(I) = "" Then
                                        aPre(I) = LocalStations(I)
                                End If
                        Next
                End If
        End If
        For I = 0 to 9
                If TunerDefaults.Value(I) <> "" Then
                        If aPre(I) = "" Then
                                aPre(I) = TunerDefaults.Value(I)
                        End If
                End If
        Next
        If Override then setCookie "PRE", null,GetPresets()

RType = Request("RType")
        searchstr = Request("searchstr")
        If searchstr = "" Then
                searchstr = "AC"
                RType = "3"
        End If
        Function GetPresets()
```

MS Ref. No. 135544.1
B&W Case No. 3797.80188

```
            Dim t, i
            t = ""
            For i = 0 To 9
                    t = t & aPre(i) & "|"
            Next
            If len(t) > 0 Then t = left(t,len(t)-1)
            GetPresets = t
      End Function
      Sub setCookie(GlobalName, SubName, CookieValue)
            Dim ExpiresDate
            ExpiresDate = DateAdd("yyyy", 5, Now())
            If IsNull(SubName) Then
                    Response.Cookies(GlobalName) = CookieValue
                    If CookieValue = "" Then
                            Response.Cookies(GlobalName).Expires = "January 1, 1980"
                    Else
                            Response.Cookies(GlobalName).Expires = ExpiresDate
                    End If
            Else
                    Response.Cookies(GlobalName)(SubName) = CookieValue
                    Response.Cookies(GlobalName).Expires = ExpiresDate
            End If
      End Sub
      %>
      <style TYPE="text/css">
      <!--
      .RBUnselected
30    {
            FONT-SIZE:9pt;
            BACKGROUND-COLOR:#d3d3d3;
            BORDER-BOTTOM:#696969 solid thin;
            BORDER-LEFT:#f5f5f5 solid thin;
35          BORDER-RIGHT:#696969 solid thin;
            BORDER-TOP:#f5f5f5 solid thin;
            WIDTH:86;
            HEIGHT:23;
      }
40    .RBSelected
      {
            FONT-SIZE:9pt;
            BACKGROUND-COLOR:#ff0000;
            COLOR:#ffffff;
45          BORDER-BOTTOM-COLOR: #ff0000;
            BORDER-BOTTOM-STYLE: none;
```

48

MS Ref. No. 135544.1
B&W Case No. 3797.80188

```
            BORDER-LEFT-COLOR: #ff0000;
            BORDER-LEFT-STYLE: none;
            BORDER-RIGHT-COLOR: #ff0000;
            BORDER-RIGHT-STYLE: none;
            BORDER-TOP-COLOR: #ff0000;
            BORDER-TOP-STYLE: thin;
            WIDTH:86;
            HEIGHT:23;
      }
10    -->
      </style>
      <script Language="JavaScript"> var CurrentButton
      var ObjTuner
      var RType = "<%=RType%>"
      var RZip = "<%=RZip%>"
      var searchstr = "<%=searchstr%>"
      var Mode = "play"
      var NewPre = null
      var today = new Date()
      var expiration = new Date(today.getTime() + 2000 * 24 * 60 * 60 * 1000); //2000 days from
      today
      var IE3 = <%=lcase(IE3)%>
      var IE4 = <%=lcase(IE4)%>
      var IE5 = <%=lcase(IE5)%>
      var NS4 = <%=lcase(NS4)%>
      var NS3 = <%=lcase(NS3)%>
      var Win32 = <%=lcase(b_Win32)%>
      var MAC = <%=lcase(MAC)%> var St = new Array()
      var Co = new Array()
      var Fo = new Array()

var Pre = new Array()
      <%
      For I = 0 to 9
              response.write "Pre[" & I & "]=" & """" & server.URLEncode(aPre(I)) & """" & vbcrlf
      Next%>
      var hp = new Array()
      var asx = new Array()
      <%
      dim values
      For I = 0 to 9
```

49

MS Ref. No. 135544.1
B&W Case No. 3797.80188

```
                    response.write "hp[" & I & "]=" & """" & """" & vbcrlf
                    response.write "asx[" & I & "]=" & """" & """" & vbcrlf
        If len(aPre(I)) > 1 Then
                values = RadioStation.LookupValue(aPre(I))
                If values <> "" Then
                        values = split(RadioStation.LookupValue(aPre(I)),"|")
                        response.write "hp[" & I & "]=" & """" & server.URLEncode(values(7))
& """" & vbcrlf
                        response.write "asx[" & I & "]=" & """" & server.URLEncode(values(9))
& """" & vbcrlf
                End If
        End If
Next For i = 0 To State2Radio.Count - 1
        ThisValue = State2Radio.Value(i)
        pos = instr(ThisValue, ",")
        FriendlyName = left(ThisValue, pos - 1)
        response.write "St[" & i + 1 & "]=" & """" & State2Radio.Key(i) & "&" &
FriendlyName & """" & vbcrlf
Next
response.write vbcrlf
%>

<%
For i = 0 To Country2Radio.Count - 1
        ThisValue = Country2Radio.Value(i)
        pos = instr(ThisValue, ",")
        FriendlyName = left(ThisValue, pos - 1)
        response.write "Co[" & i + 1 & "]=" & """" & Country2Radio.Key(i) & "&" &
FriendlyName & """" & vbcrlf
Next
response.write vbcrlf
%>

<%
For i = 0 To RadioFormats.Count - 1
        FriendlyName = RadioFormats.Value(i)
        response.write "Fo[" & i + 1 & "]=" & """" & RadioFormats.Key(i) & "&" &
FriendlyName & """" & vbcrlf
Next
%>
function newSelect(num,itm,inlinecall){
        var src, txt
        RType = num
        if(IE3){
```

MS Ref. No. 135544.1
B&W Case No. 3797.80188

```
                    frames[0].location.replace("select.asp?RType=" + num + "&searchstr=" +
        searchstr)
                    document.cookie = "RTYPE=" + num + "; path=/;"
                    return
            }
            var match = 0
            var sel = document.refine.searchstr
            if(num == 1){
                    src = St
                    txt = "US State"
            }else{
                    if(num == 2){
                            src = Co
                            txt = "Location"
                    }else{
                            src = Fo
                            txt = "Format"
                    }
            }
            document.cookie = "RTYPE=" + num + "; path=/;"
            sel.options.length = src.length;
            sel.options[0].text = "Select a " + txt + " here"
            for(var i=1; i < src.length; i++) {
                    var o = sel.options[i]
                    o.value = src[i].substring(0, src[i].indexOf('&'))
                    o.text = src[i].substring(src[i].indexOf('&')+1, src[i].length)
                    if(o.value == "<%=searchstr%>" && inlinecall) match = i
                    if(o.value == itm){
                            match = i
                    }
            }
            sel.selectedIndex = match;
    } function StartTuner(Bnum){
            if (Mode=="play"){
                    if(Pre[Bnum]!=""){
                            if(IE4 && Win32){
                                    objTuner = window.open("/Radio/Tuner.asp?code=" + Pre[Bnum]
    + "&btn=" + Bnum + "&Pre=" + GetPresets() + "&zip=" +
    RZip,"Tuner","width=528,height=224,toolbar=no,status=no,top=100,left=50",1)
                            }else{
                                    if(IE5) {
                                            location.href = unescape("vnd.ms.radio:" + asx[Bnum])
                                    }else{
                                            location.href = unescape(asx[Bnum])
```

51

MS Ref. No. 135544.1
B&W Case No. 3797.80188

```
                        }
                    }
                }else{
                    return
                }
                CurrentButton = Bnum
                if(hp[Bnum]!=null) var tmout = window.setTimeout("jumpTo();",4000)
            }else{
                SetPreset(Bnum)
            }
        } function jumpTo(){
            location.href = unescape(hp[CurrentButton])
        } function Reload(){
            location.href = "radio.asp"
        } function SetPreset(Bnum){
            var p1,code
            var thisBut = document.presets.elements[Bnum]
            code = NewPre
            thisBut.value = ""
            Pre[Bnum] = code
            setCookie("PRE",GetPresets())
            tmout = window.setTimeout("Reload();",100)
        } function GetPresets(){
            var t = ""
            for(var i = 0; i <= 9; i++){
                t = t + Pre[i] + "|"
            }
            t = t.substring(0,t.length-1)
            return t
        } function DoSearch(){
            var srch
            if(IE3){
                srch = frames[0].searchstr.options[frames[0].searchstr.options.selectedIndex].value
```

52

MS Ref. No. 135544.1
B&W Case No. 3797.80188

```
                if(frames[0].searchstr.selectedIndex!=0)top.frames[1].location.replace("results.asp?RTyp
        e=" + RType + "&searchstr=" + srch)
                }else{
                        srch =
        document.refine.searchstr.options[document.refine.searchstr.options.selectedIndex].value if(document.refine.searchstr.selectedIndex!=0)top.frames[0].location.replace("results.asp
        ?RType=" + RType + "&searchstr=" + srch)
10              }
                document.cookie = "SEARCHSTR=" + srch + "; path=/;"
        } function setCookie(cName, Props) {
                document.cookie = cName + "=" + Props + "; path=/; expires=" +
        expiration.toGMTString()
                DocCook = document.cookie;
        }

        function ClearCookie (name) {
                document.cookie = name + "=" + "; expires=Tue, 01-Jan-80 00:00:01 GMT; path=/"
        } function getCookie(CookieName) {
25              var DocCook = document.cookie
                var index = DocCook.indexOf(CookieName + "=");
                if (index == -1) return "";
                index = DocCook.indexOf("=", index) + 1;
                var endstr = DocCook.indexOf(";", index);
30              if (endstr == -1) endstr = DocCook.length;
                var cookie = unescape(DocCook.substring(index, endstr));
                if (cookie == null || cookie == "null" || cookie == "" || cookie.indexOf("undefined") >= 0 ||
        cookie.lastIndexOf("=") == cookie.length - 1) {
                        cookie = ""
35              }
                return cookie
        } function Verify(frm){
40              var z = frm.zip.value
                if(z.length != 5 || (parseInt(z).toString() != z && z.substring(0,1) != "0")){
                        alert("To personalize by zipcode, enter a valid zipcode in the text box and click
        Go.")
                        return false
45              }
                var fnd = false
```

53

MS Ref. No. 135544.1
B&W Case No. 3797.80188

```
                for(var i = 0; i <= 4; i++){
                        if (Pre[i] != "")fnd = true
                }
                if (fnd) {
                        if(confirm("This will change up to five presets in the top row.")){
                                document.cookie = "OVERRIDE=T; path=/"
                                return true
                        }else{
                                return false
                        }
                }
                document.cookie = "OVERRIDE=T; path=/"
                return true
        }
        function ClearAllCookies(){
                if(confirm("This will restore the original Radio Station Guide default stations. Do you
        want to continue?")){
                        ClearCookie("zip")
                        ClearCookie("PRE")
                        location.href = "default.asp"
                }
        } function newCat(o,s) {
                var catcode;
                catcode = o.options[s].value;
                if(catcode != "") {
                        top.location.href = "/OnDemand/OnDemand.asp?Cat=" + catcode;
                }
        }

</script>
        </head>

<body bgcolor="#FFFFFF" text="#000000" link="#000066" vlink="#808080" alink="#FF3300"
        topmargin="0" leftmargin="0">
        <basefont FACE="ARIAL,SANS-SERIF" SIZE="2">

<!--#include virtual="/chan/showad.asp" -->
        <!--#include virtual="/chan/showpromo.asp" -->
        <!--#include virtual="/chan/webevents/tban.asp"-->

<table WIDTH="100%" CELLPADDING="0" CELLSPACING="0" BORDER="0">
                <tr>
                        <!-- LEFT COLUMN BEGIN-->
```

54

MS Ref. No. 135544.1
B&W Case No. 3797.80188

```
            <td WIDTH="154" VALIGN="top" ALIGN="left">
                    <table CELLPADDING="0" CELLSPACING="0" BORDER="0">
                            <tr><td BGCOLOR="#000066"><img
SRC="/images/imgRA.JPG" WIDTH="154" HEIGHT="126"></td></tr>
                                    <tr><td><img SRC="/images/ttlRadio.GIF" WIDTH="154"
HEIGHT="77" alt="Radio Station Guide"></td></tr>
                    </table>

<table HEIGHT="100%" CELLPADDING="0" CELLSPACING="0"
BORDER="0">
                            <tr>
                                    <td WIDTH="43" BGCOLOR="#000066"><img
SRC="/images/ts.gif" HEIGHT="275" WIDTH="43"><% if not IE then %><br><img
SRC="/images/imgNTSPECurve.GIF" WIDTH="43" HEIGHT="80"><% end if %></td>
                                    <td WIDTH="10"> </td>
                                    <td valign="top">
                                            <font face="Arial,Verdana,Helvetica" size="1">
                                            To listen to these stations, be sure you have the <a
href="http://www.microsoft.com/windows/mediaplayer/download/default.asp">Windows Media
Player</a>!<br>
                                                    <a
href="http://www.microsoft.com/windows/mediaplayer/download/default.asp"><img
src="/images/getmediaplayer.gif" vspace="5" BORDER="1" ALT="Get Windows Media
Player" WIDTH="65" HEIGHT="57"></a><br><br><br><br>
                                                    <% if not IE5 then %>
                                                    <%= EditText.LookupValue("RALeft") %><br>
                                                    <a
href="http://www.microsoft.com/windows/ie/"><img src="/images/lgoIE5.gif" vspace="5"
alt="Download your copy of IE 5 today!" border="0" WIDTH="49" HEIGHT="49"></a><br>
                                                    <% end if %>
                                            </font>
                                    </td>
                            </tr>
                    </table>
            </td>
            <!--LEFT COLUMN END -->

<!--RIGHT COLUMN BEGIN -->
            <td VALIGN="top">

<table CELLPADDING="0" CELLSPACING="0" BORDER="0">
                            <tr>
                                    <td WIDTH="100%" rowspan="3" valign="top">
                                            <table WIDTH="100%" CELLPADDING="0"
CELLSPACING="0" BORDER="0">
                                                    <tr>
```

MS Ref. No. 135544.1
B&W Case No. 3797.80188

```
                                        <td VALIGN="top"
WIDTH="100%" HEIGHT="6" BGCOLOR="#000066"><img SRC="/images/ts.gif"
HEIGHT="6" ALIGN="top"></td>
                                        <td VALIGN="top" WIDTH="25"
rowspan="2"><img SRC="/images/imgShellCurve.GIF" WIDTH="25" HEIGHT="41"
ALIGN="top"></td>
                                </tr>
                                <tr><td WIDTH="100%">
                                        <table cellpadding="0"
cellspacing="0" BORDER="0"><tr><td WIDTH="24"> </td><td>
                                        <br><font face="Arial,Helvetica"
size="2" class="weMainTxt">Browse for radio stations below<% If PresetsOK Then %> or
enter your US zip code at right for quick personalization.
                                        NOTE: When you
"push" a radio tuner button, the station's Web site appears while the station is loading
(~30 seconds)<% End If %>.<br></font>
                                        </td></tr></table>
                                </td></tr>
                        </table>
                </td>

<td WIDTH="170" BGCOLOR="#000066">
                        <table CELLPADDING="0" CELLSPACING="0"
BORDER="0">
                                <tr>
                                        <td><img SRC="/images/ts.gif"
WIDTH="10" HEIGHT="1" ALIGN="left"></td>
                                        <td WIDTH="160"><font
face="Arial,Helvetica" size="2" color="#ffcc66" class="weYellowTxt">all audio/video
categories</font></td>
                                </tr>
                                <tr>
                                        <td><img SRC="/images/ts.gif"
WIDTH="10" HEIGHT="9"></td>
                                        <td height="30" WIDTH="160"
nowrap>
                                        <form id="Cat"
NAME="Cat" ACTION="/OnDemand/ondemand.asp" METHOD="get">
                                        <select id="Cat"
NAME="Cat" SIZE="1" onchange="newCat(this,this.selectedIndex);">
                                        <% For J = 0 to
Categories.Count - 2 %>
                                        <option
VALUE="<%= Categories.Key(J)%>" <% If Categories.Key(J) = "RA" Then %>
SELECTED<% End If %>><%= Categories.Value(J) %></option>
                                        <% Next %>
```

56

MS Ref. No. 135544.1
B&W Case No. 3797.80188

```
                                                            </select>
                                                        </form><!---->
                                                    </td>
                                                </tr>
                                            </table>
                                        </td>
                                    </tr>
                                    <% If PresetsOK then %>
                                    <tr>
                                        <td align="right">
                                            <table cellpadding=0 cellspacing=0 width="170"><tr><td height="30"><%
                                                if RZip = "" or request("mode")="newzip" Then %>
                                                <form onsubmit="return Verify(this);"> <input TYPE="text" NAME="zip" SIZE="10" MAXLENGTH="5" VALUE="<%
                                                    If RZip <> "" Then
                                                        Response.write RZip
                                                    ElseIf IE then
                                                        Response.Write "    enter zip"
                                                    Else
                                                        Response.Write "enter zip"
                                                    End If %>"> <input TYPE="IMAGE" SRC="/images/Go_red.GIF" alt="GO" BORDER="0" ALIGN="absmiddle" WIDTH="25" HEIGHT="21">
                                                </form><!---->
                                                <% Else %>
                                                <a href="radio.asp?mode=newzip"><font face="Arial,Helvetica" size="2" class="weMainTxt">Change to a zip code other than <%= RZip %></font></a><font face="Arial,Helvetica" size="2" class="weMainTxt">, or </font>
                                                <a href="javascript:ClearAllCookies()"><font face="Arial,Helvetica" size="2" class="weMainTxt">restore defaults</font></a>.
                                                <% End If %>
                                            </td></tr></table>
                                        </td>
                                    </tr>
                                    <tr><td><img SRC="/images/ts.gif" WIDTH=1 HEIGHT=25></td></tr>
                                </table>
                                <form name="presets" style="margin-bottom:-20px;margin-top:3px">
                                    <table cellpadding="0" cellspacing="0"><tr><td WIDTH="24"> </td><td><font face="Arial,Helvetica" size="2" class="weMainTxt" color="#FF3300">Click a button to hear a radio station's direct webcast:</font></td></tr></table>
                                    <div<% If IE Then %> STYLE="BACKGROUND-IMAGE:url(/images/bkgSwooshB.gif);BACKGROUND-REPEAT:no-repeat"<% End If %>>
```

57

MS Ref. No. 135544.1
B&W Case No. 3797.80188

```
                        <table CELLPADDING="0" CELLSPACING="0" height="95"
width="466">
                                <tr>
                                        <td WIDTH="24"><img src="/images/ts.gif" width="24"
height="95"></td>
                                        <td>
                                                <table CELLPADDING="0" CELLSPACING="2"
BORDER="0" width="100%">
                                                        <tr><td COLSPAN="5"><img
SRC="/images/ts.gif" WIDTH="438" HEIGHT="7"></td></tr>
                                                        <tr>
                                                                <% For I = 0 To 4
                                                                        GenButton(I)
                                                                        Next %>
                                                        </tr>
                                                        <tr>
                                                                <% For I = 5 To 9
                                                                        GenButton(I)
                                                                        Next %>
                                                        </tr>
                                                        <tr><td COLSPAN="5"
align="center"><font size="1" face="arial">56k or higher is recommended</font></td></tr>
                                                </table>
                                        </td>
                                </tr>
                        </table>
                </div>
        </form>
        <% else %>
        </table>
        <% End If %>
        <form name="refine" ACTION="/radio/radio.asp" METHOD="GET"
STYLE="margin-bottom:0px;">
                <table width="464" CELLPADDING="0" CELLSPACING="0">
                        <tr>
                                <td width="26"> </td>
                                <td>
                                        <table cellpadding="0" cellspacing="0"
height="25" border="0"><tr><td>
                                                <img SRC="/images/ts.gif" WIDTH="1"
HEIGHT="8"><br>
                                                <font face="Arial,Helvetica" size="2"
class="weMainTxt" color="#FF3300">Browse radio stations<% If PresetsOK Then %> or
personalize your tuner<% end if %>:</font><br>
                                        </td></tr></table>
```

58

MS Ref. No. 135544.1
B&W Case No. 3797.80188

```
                                       <table width="438" cellspacing="0" BORDER="0"
bgcolor="#000066">
                                       <tr>
                                       <td><font face="Arial,Helvetica"
size="2" class="weMainTxt" color="#FFFFFF"><input name="RType" id="typ1"
onclick="newSelect(1,'',false);" value="1" type="radio" <%if RType = 1 then Response.Write
"checked"%>> <label for="typ1">US State</label></font></td>
                                       <% If NS3 OR NS4 Then %>
                                       <td><font face="Arial,Helvetica"
size="2" class="weMainTxt" color="#FFFFFF"><input name="RType" id="typ2"
onclick="newSelect(2,'',false);" value="2" type="radio" <%if RType = 2 then Response.Write
"checked"%>> <label for="typ2">Int'l</label></font></td>
                                       <% Else %>
                                       <td><font face="Arial,Helvetica"
size="2" class="weMainTxt" color="#FFFFFF"><input name="RType" id="typ2"
onclick="newSelect(2,'',false);" value="2" type="radio" <%if RType = 2 then Response.Write
"checked"%>> <label for="typ2">International</label></font></td>
                                       <% End If %>
                                       <td><font face="Arial,Helvetica"
size="2" class="weMainTxt" color="#FFFFFF"><input name="RType" id="typ3"
onclick="newSelect(3,'',false);" value="3" type="radio" <%if RType = 3 then Response.Write
"checked"%>> <label for="typ3">Format</label></font></td>
                                       <td align="right"><%
If IE3 Then%>
                                       <iframe Height="30"
Width="160" Frameborder="0" MarginHeight="0" Marginwidth="0" Scrolling="no"
id="frmSel" src="select.asp?RType=<%=RType%>&searchstr=<%=searchstr%>"
width="170" height="20"></iframe>
                                       <%Else%>
                                       <select <%if MAC And Not
IE4 Then%>style="width:130" <%else%>style="width:175" <%end if%><% if IE Then %>
onchange="DoSearch();" <% End If %> name="searchstr">
                                       <option
selected>Select a Format here     </option>
                                       <option>
                                       <option>
                                       <option>
                                       <option>
                                       <option>
                                       <option>
                                       </select>
                                       <% If not IE4or5 Then
%> <input TYPE="IMAGE" SRC="/images/Go_red.GIF" alt="GO" BORDER="0"
NAME="SUBMIT" VALUE="Search" ALIGN="absmiddle" WIDTH="25" HEIGHT="21"><%
End If %>
                                       <%End If%>
```

MS Ref. No. 135544.1
B&W Case No. 3797.80188

```
                                                </td>
                                        </tr>
                                </table>
                        </td>
                </tr>
        </table>
        </form>
        <script language="javascript">
        <!--
                var lastStr = getCookie("SEARCHSTR")
                if(lastStr.length > 0) {
                        searchstr = lastStr
                        RType = getCookie("RTYPE")
                }
                <%If Not IE3 Then%>
                        newSelect(RType, searchstr, true)
                <%else%>
                        refine.elements[parseInt(RType) - 1].checked = true
                <%End If%>
        //-->
        </script>
                        <table CELLPADDING="0" CELLSPACING="0" BORDER="0">
                                <tr>
                                        <td width="27"> </td>
                                        <td>
                                        <% If IE Then %>
                                                <iframe
src="results.asp?RType=<%=RType%>&searchstr=<%=searchstr%>" width="438"
height="226"></iframe>
                                        <% Else %>
                                                <% ShowResults%>
                                        <% End If %>
                                        </td>
                                </tr>
                        </table>
                        <br>
                        <table CELLPADDING="0" CELLSPACING="0" BORDER="0"
width="464">
                                <tr>
                                        <td width="14"> </td>
                                        <td VALIGN="top"><img SRC="/images/icoWrite.gif"
WIDTH="38" HEIGHT="20"></td>
                                        <td VALIGN="top" CLASS="WEMaintxt"><%=
EditText.LookupValue("RATellUs") %></td>
                                        <td VALIGN="top"><img SRC="/images/icoWrite.gif"
WIDTH="38" HEIGHT="20"></td>
```

MS Ref. No. 135544.1
B&W Case No. 3797.80188

```
                                          <td VALIGN="top" CLASS="WEMaintxt">
                                              <form ACTION="/NewsLetter/NewsLetter.asp"
    METHOD="post">
                                          <%
    =EditText.LookupValue("RASubscribe") %><br>
                                              <input TYPE="text" NAME="emailAdr"
    SIZE="25" MAXLENGTH="100" VALUE="your email">
                                              <input TYPE="IMAGE"
    SRC="/images/Go_red.GIF" alt="GO" BORDER="0" NAME="SUBMIT" VALUE="Search"
    ALIGN="absmiddle" WIDTH="25" HEIGHT="21">
                                              </form>
                                          </td>
                                      </tr>
                                  </table>
15                                <a HREF="http://network.msn.com/snav/webevents.asp"
    TARGET="_top"><img SRC="http://network.msn.com/snav/webevents.gif" WIDTH="130"
    HEIGHT="80" BORDER="0" ALT="MSN.COM Network Promotion" HSPACE="10"
    VSPACE="10" ALIGN="RIGHT"></a>
                              </td>
20                        </tr>
    </table>
    </td></tr></table>
    <!--#include virtual="/chan/webevents/bban.asp"-->
    </body>
    </html>

<%
    Function trunc(txt)
        Dim shrt
        If len(txt) => 15 Then
            shrt = left(txt,13)
            If mid(shrt,12,13) = " " Then
                shrt = left(shrt,12)
            End If
            trunc = shrt & "..."
        Else
            trunc = txt
        End If
    End Function
    Sub GenButton(Bnum)
        dim StationInfo, ButtonText, FriendlyText, title
        StationInfo = ""
        If aPre(Bnum) <> "" Then
            StationInfo = RadioStation.LookupValue(aPre(Bnum))
        End If
```

61

MS Ref. No. 135544.1
B&W Case No. 3797.80188

```
                If StationInfo = "" Then %>
                        <td WIDTH="20%" align="center">
                                <input type="button" ID="btn<%= Bnum %>" onclick="StartTuner(<%=
        Bnum %>);" value="            " title="Empty preset" CLASS="RBUnselected"
        style="color:gray" ALIGN="center" VALIGN="middle">
                        </td>
                <% Else
                        StationInfo = Split(StationInfo,"|")
                        ButtonText = StationInfo(0)
                        FriendlyText = StationInfo(1)%>
                        <td WIDTH="20%" align="center">
                                <input type="button" ID="btn<%= Bnum %>" onclick="StartTuner(<%= Bnum
        %>);" <% if len(trunc(ButtonText)) < 5 then %>value="   <%= trunc(ButtonText) %>    " <%
        else %>value="<%= trunc(ButtonText) %>" <% end if %> title="<%=FriendlyText & " (" &
        Radio2Format.Lookupvalue(aPre(Bnum)) & ")"%>" CLASS="RBUnselected" ALIGN="center"
        VALIGN="middle">
                        </td>
                <% End If
        End Sub %>
```

What is claimed is:

1. A computer-readable medium having computer-executable instructions for performing steps comprising:

displaying a text box and at least one graphical object on a Web page;

allowing a zip code to be manually entered into said text box;

identifying, after the zip code has been entered, at least one URL geographically relevant to said zip code wherein said URL identifies a source of streaming-media content;

assigning said at least one URL to said at least one graphical object, wherein said URL identifies a source of streaming-media content, said source of streaming-media content is a radio station, and said radio station is geographically close to said zip code;

storing the zip code in a first data field of a cookie data structure, the first data field stored in a first region of a range of memory addresses on the computer-readable medium;

using the zip code contained in the cookie data structure in order to assign said at least one URL to said at least one graphical object each time the Web page is displayed;

replacing said text box on said Web page with at least one hyperlink, said hyperlink identifying the zip code that has been entered; and allowing user selection of the hyperlink in order to modify the zip code.

2. The computer-readable medium of claim 1, wherein the cookie data structure is stored on a second computer-readable medium.

3. The computer-readable medium of claim 1, wherein said at least one graphical object is a radio button.

* * * * *

UNITED STATES PATENT AND TRADEMARK OFFICE
CERTIFICATE OF CORRECTION

PATENT NO. : 6,639,610 B1  Page 1 of 2
DATED : October 28, 2003
INVENTOR(S) : Tom A. Sponheim et al.

It is certified that error appears in the above-identified patent and that said Letters Patent is hereby corrected as shown below:

Title page,
Item [56], References Cited, OTHER PUBLICATIONS, please replace "Yahoo?" with -- Yahoo! --
Item [57], ABSTRACT, please remove "In one aspect of the present invention...", "In a second aspect of the invention,...", "In a third aspect of this invention, search results are displayed in an IFRAME so that the Web page need not be replotted each time the server identifies URLs satisfying the user selection criteria. In a fourth aspect of this invention,..."

Column 1,
Line 40, please replace "also include" to -- also can include --.
Line 43, please replace " 'uniform resource locator' " with -- "Uniform Resource Locator" --

Column 2,
Line 62, please insert -- (A "cookie" is a message—code strong —given to a Web browser by a Web server.) --

Column 4,
Line 6, please replace "hyperlinks" with --a hyperlink --
Line 8, please replace "radio-station URLs" with -- radio-station names and corresponding URLs --
Line 25, please replace "the URL" with -- the name and corresponding URL --

Column 6,
Line 37, please replace "invention." with -- invention -- with the only difference being that FIG 2's zip-code text-entry box shows the instruction "enter text", whereas FIG 3's zip-code text-entry box shows actual zip code. --
Lines 40-44, please replace "a typical use of a group of radio buttons is to ask for an exclusive response, such as the means of payment for an order (credit card, check and so forth). Because there can only be one payment type specified" with -- when a user is asked how he or she would like to pay for an item, a user might be provided with a number of choices such as by credit card, cash, check or money order. Since the user should select one—and only one—method of payment, --

Column 7,
Line 1, after "button 208.", please insert -- Alternatively, the user could simply enter the zip code and press enter. --
Line 17, please replace "more particularly" with -- such as for example --

UNITED STATES PATENT AND TRADEMARK OFFICE
CERTIFICATE OF CORRECTION

PATENT NO. : 6,639,610 B1
DATED : October 28, 2003
INVENTOR(S) : Tom A. Sponheim et al.

It is certified that error appears in the above-identified patent and that said Letters Patent is hereby corrected as shown below:

Column 8,
Line 35, please replace "results on" with -- results, preferably in an IFRAME 800, on --

Column 9,
Line 22, after "data structure.", please insert -- One example of a suitable data structure is a cookie; however any other type of data structure could be used. --

Signed and Sealed this

Tenth Day of August, 2004

JON W. DUDAS
*Acting Director of the United States Patent and Trademark Office*